(12) United States Patent
Steeves et al.

(10) Patent No.: US 10,728,716 B2
(45) Date of Patent: Jul. 28, 2020

(54) CONTEXT SENSITIVE MESSAGE NOTIFICATIONS

(71) Applicant: BlackBerry Limited, Waterloo (CA)

(72) Inventors: Ryan David Steeves, Kitchener (CA); Rudolph Ferdinand Ziegler, Toronto (CA); Alexander James Pedwysocki, Toronto (CA); Jonas Ove Arbsjö, Malmö (SE); Haobin Li, Kitchener (CA)

(73) Assignee: BlackBerry Limited, Waterloo, Ontario (CA)

(*) Notice: Subject to any disclaimer, the term of this patent is extended or adjusted under 35 U.S.C. 154(b) by 229 days.

(21) Appl. No.: 13/931,166

(22) Filed: Jun. 28, 2013

(65) Prior Publication Data

US 2015/0004945 A1 Jan. 1, 2015

(51) Int. Cl.
| | |
|---|---|
| H04M 1/663 | (2006.01) |
| H04W 4/12 | (2009.01) |
| G06F 3/0488 | (2013.01) |
| H04M 1/725 | (2006.01) |
| H04L 12/58 | (2006.01) |

(52) U.S. Cl.
CPC ............ *H04W 4/12* (2013.01); *G06F 3/0488* (2013.01); *H04L 51/24* (2013.01); *H04M 1/72552* (2013.01)

(58) Field of Classification Search
CPC ...... H04W 4/12; H04W 4/14; H04M 1/72519
USPC .................... 455/412.2, 466, 550.1
See application file for complete search history.

(56) References Cited

U.S. PATENT DOCUMENTS

| | | | |
|---|---|---|---|
| 7,996,045 B1 | 8/2011 | Bauer et al. | |
| 8,117,304 B2* | 2/2012 | Grigsby | G06F 9/542 709/223 |
| 8,147,248 B2* | 4/2012 | Rimas-Ribikauskas | G09B 7/00 434/118 |
| 2007/0211172 A1* | 9/2007 | Kondo | H04N 5/44513 348/563 |
| 2008/0268882 A1* | 10/2008 | Moloney | H04L 51/18 455/466 |
| 2009/0186634 A1* | 7/2009 | Sureka et al. | 455/466 |
| 2010/0281409 A1 | 11/2010 | Rainisto et al. | |
| 2011/0179366 A1* | 7/2011 | Chae | 715/764 |
| 2011/0239228 A1* | 9/2011 | Grigsby | G06F 9/542 719/313 |

(Continued)

OTHER PUBLICATIONS

Extended European Search Report dated Dec. 4, 2013, in corresponding European patent application No. 13174437.7.

(Continued)

*Primary Examiner* — Matthew W Genack
(74) *Attorney, Agent, or Firm* — Fish & Richardson P.C.

(57) ABSTRACT

A method and device for generating message notifications at a mobile device is provided. A current operating context of the mobile device is determined. A first display representation for the received message in accordance with notification display settings associated with the determined current operating context is determined. Gesture information from a touch input component is determined and a second display representation comprising at least a portion of the received message and an action area for performing a direct action in response to the received message in response to the determined gesture information is generated.

20 Claims, 20 Drawing Sheets

(56) References Cited

U.S. PATENT DOCUMENTS

| | | |
|---|---|---|
| 2011/0260970 A1 | 10/2011 | Kuo et al. |
| 2011/0265003 A1* | 10/2011 | Schubert et al. ............. 715/716 |
| 2012/0054683 A1 | 3/2012 | Sands et al. |
| 2012/0252416 A1* | 10/2012 | Kissinger .............. H04M 19/04 |
| | | 455/412.2 |
| 2012/0328090 A1* | 12/2012 | Macwan et al. ......... 379/114.03 |
| 2013/0282844 A1* | 10/2013 | Logan ..................... H04L 67/02 |
| | | 709/206 |
| 2013/0346922 A1* | 12/2013 | Shiplacoff ........... G06F 3/04842 |
| | | 715/835 |
| 2014/0018049 A1* | 1/2014 | Cannon .................. H04W 4/16 |
| | | 455/414.1 |

OTHER PUBLICATIONS

Communication pursuant to Article 94(3) EPC issued in EP Application No. 13174437.7-1216 dated Jul. 19, 2018; 5 pages.
Communication pursuant to Article 94(3) EPC issued in EP Application No. 13174437.7-1216 dated Feb. 1, 2019; 3 pages.

* cited by examiner

CONTEXT SENSITIVE MESSAGE NOTIFICATIONS

TECHNICAL FIELD

The current description relates to systems, devices and methods for generating message notifications and in particular to generating message at a mobile device based upon an operating context.

BACKGROUND

Mobile devices, such as smart phones and tablets, allow users to send and receive messages with others. When messages are received at the mobile device, a notification may be presented to indicate to the user that a message has been received. The notification may present at least a portion of the message to the user. Messages can be presented to the user in graphical representation to notify them of events such as new messages, missed phone calls, status updates, etc., typically in a pop-up or notification center requiring the user to enter the associated application to respond to the notification.

While it can be advantageous to receive notifications of messages on a mobile device it may be desirable to provide additional, alternative and/or improved functionality for presenting notifications on the mobile device.

BRIEF DESCRIPTION OF THE DRAWINGS

Further features and advantages of the present disclosure will become apparent from the following detailed description, taken in combination with the appended drawings, in which.

DETAILED DESCRIPTION

In accordance with the present disclosure there is provided a method for generating message notifications at a mobile device, the method comprising determining a current operating context of the mobile device; generating a first notification representation for a message in accordance with notification display settings associated with the determined current operating context; determining gesture information from a touch input component; and generating a second notification representation comprising at least a portion of the message and an action area for performing a direct action associated with the message in response to the determined gesture information.

In accordance with the present disclosure there is further provided a mobile device comprising a processor; and a memory coupled to the processor comprising instructions for generating message notifications at a mobile device comprising: determining a current operating context of the mobile device; generating a first notification representation for a message in accordance with notification display settings associated with the determined current operating context; determining gesture information from a touch input component; and generating a second notification representation comprising at least a portion of the message and an action area for performing a direct action associated with the message in response to the determined gesture information.

Embodiments are described below, by way of example only, with reference to FIGS. 1-20. Mobile devices, such as mobile phones, smartphone and tablets, can receive messages from numerous channels such as one or more e-mail accounts, instant messaging applications, short message service (SMS) text messaging applications, as well push notification applications such as stock price applications and sports scores applications. The mobile device can notify a user when a new message is received from one of the communication or messaging channels. As described further herein, the notification displayed on the mobile device may include functionality for facilitating taking an action, such as responding to a message, directly from the notification reducing processing requirements on the device and the number of user actions to respond to the notification. As further described herein, a notification of a message received at the mobile device may be displayed on a second device in communication with the mobile device. Control of the notification displayed on the second device may be provided to reduce an intrusiveness of notifications while still providing meaning notifications as well as notifications with direct actions.

Figure 1:
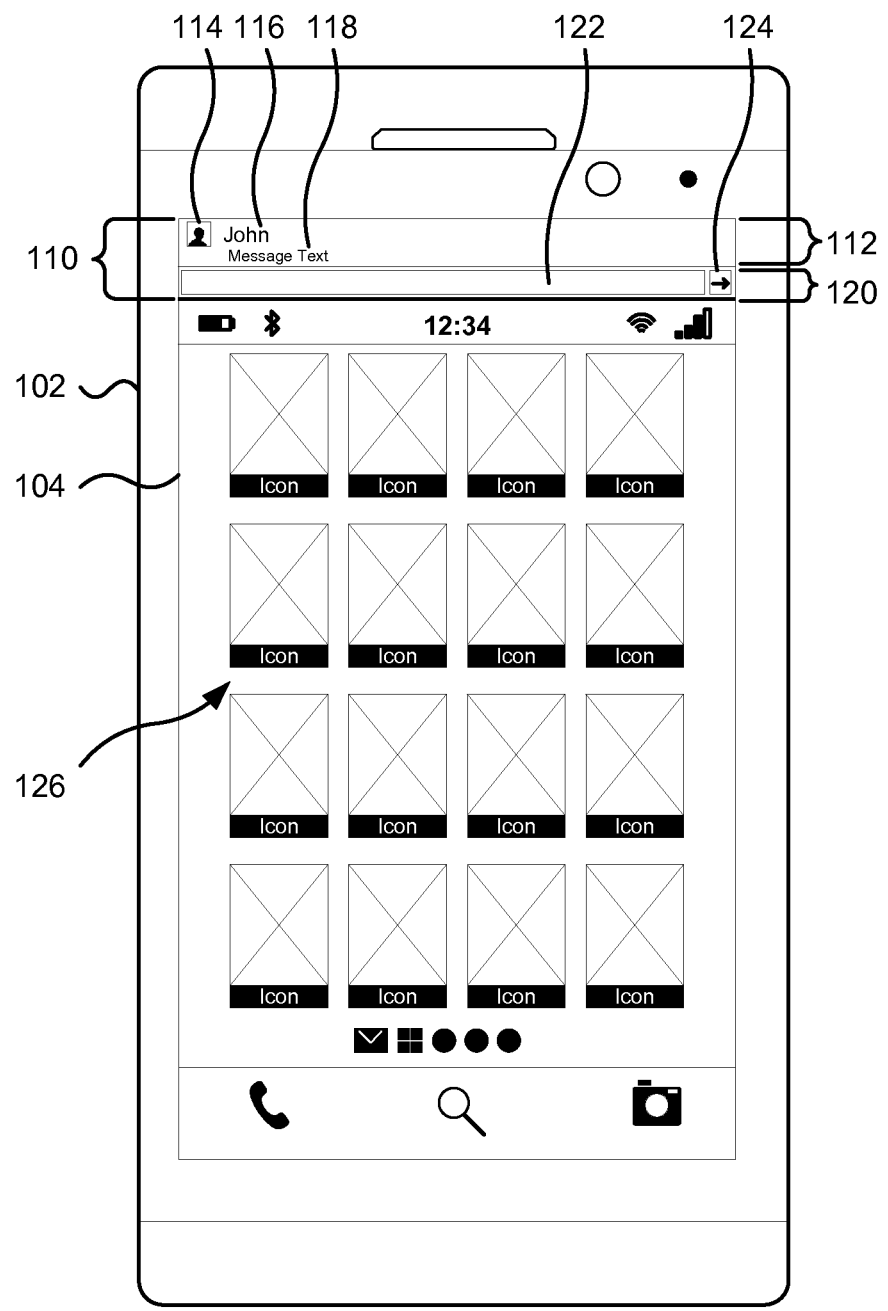
FIG. 1 depicts displaying an actionable notification on a mobile device.

FIG. 1 depicts displaying an actionable notification on a mobile device. The mobile device 102 is depicted as a mobile phone although other mobile devices that are capable of sending and receiving messages are contemplated as well. The mobile device 102 comprises a display 104 for displaying a user interface. The display 104 may be a touch sensitive display providing an input component for the mobile device. A user of the mobile device 102 may have one or more applications on the mobile device for receiving messages from different channels. For example, a user may have a number of e-mail accounts setup to receive messages on the mobile device. Additional communication channels may include social media applications such as Twitter®, Facebook® and LinkedIn®. Further communication channels may include instant messaging applications such as Blackberry Messenger BBM®, Skype® Windows Live Messenger® and others. Further communication channels may include applications on the mobile device 102 that receive pushed messages from remote sources such as applications that push sports scores, news, stock prices or other alerts. Typically, it is possible to specify a notification to be used for informing the user of a new message. For example, a user may select an alert tone or sound to notify the user of a new e-mail. It is often possible to customize the notifications based on the channel the message was received from as well as other message information. For example, a user may select one alert tone for e-mails received from a personal account and a different alert tone for e-mails received from a work account.

In addition to sound alerts, it is possible to provide visual notifications. For example a blinking light may be used to notify a user of a new message. Further, the notification may be displayed on the display as a pop-up or banner or other similar graphical representation. The pop-up or banner may display a portion of the text of the message and/or other relevant information.

As depicted in FIG. 1, a notification 110 for a received message may be displayed on the mobile device 102. The notification 110 is depicted as a banner displayed at the top of the display 104. When displaying such a banner notification, the banner may be displayed overtop of the currently displayed user interface. Alternatively, the user interface may be displaced downward, or the size of the user interface reduced to allow the banner notification 110 to be displayed without obstructing other visual components of the display. As depicted in FIG. 1, a home screen user interface 126 is displaced downwards to allow the notification to be displayed above the home screen. It will be appreciated that a banner type notification may be presented at other locations such as the bottom of the display. Further, the notification may be displayed as a pop-up which can be overlaid over the current user interface.

The notification 110 may comprise a message section 112 that displays information associated with the received message associated with the notification. The message section 112 may display an icon or graphic 114 associated with a sender of the message or associated with the type of message, as well as a name 116 associated with the sender of the message. The name of the sender may be displayed based on contact information of the sender stored in the mobile device. Additionally, the notification may display text 118 associated with the message. For example, if the notification is for an e-mail, the text 118 may be the subject line of the e-mail and/or a body of the e-mail message.

In addition to the message section 112, the notification 110 may include a direct action area 120 associated with performing a direct action. The direction action area 120 may vary depend upon the notification, or the message channel associated with the notification. For example, if the message associated with the notification is a text based messaging application, the direct action may be associated with replying to the received message. The direct action area may include a text box area 122 for inputting reply text as well as a reply button 124 for sending the reply. It is contemplated that the reply button may be omitted or replaced with another button. If the reply button 124 is not presented, than the reply text may be sent when the user presses enter, or takes a similar action.

The notification 110 allows a notification for a message to be displayed along with an associated action that can be performed directly from the notification. When a message is received on the mobile device, a notification providing a direct action can be displayed on the device and as described further below, the message notification may be passed to a second device computing device, such as a tablet or desktop computer or laptop and displayed on the secondary screen.

Figure 2:
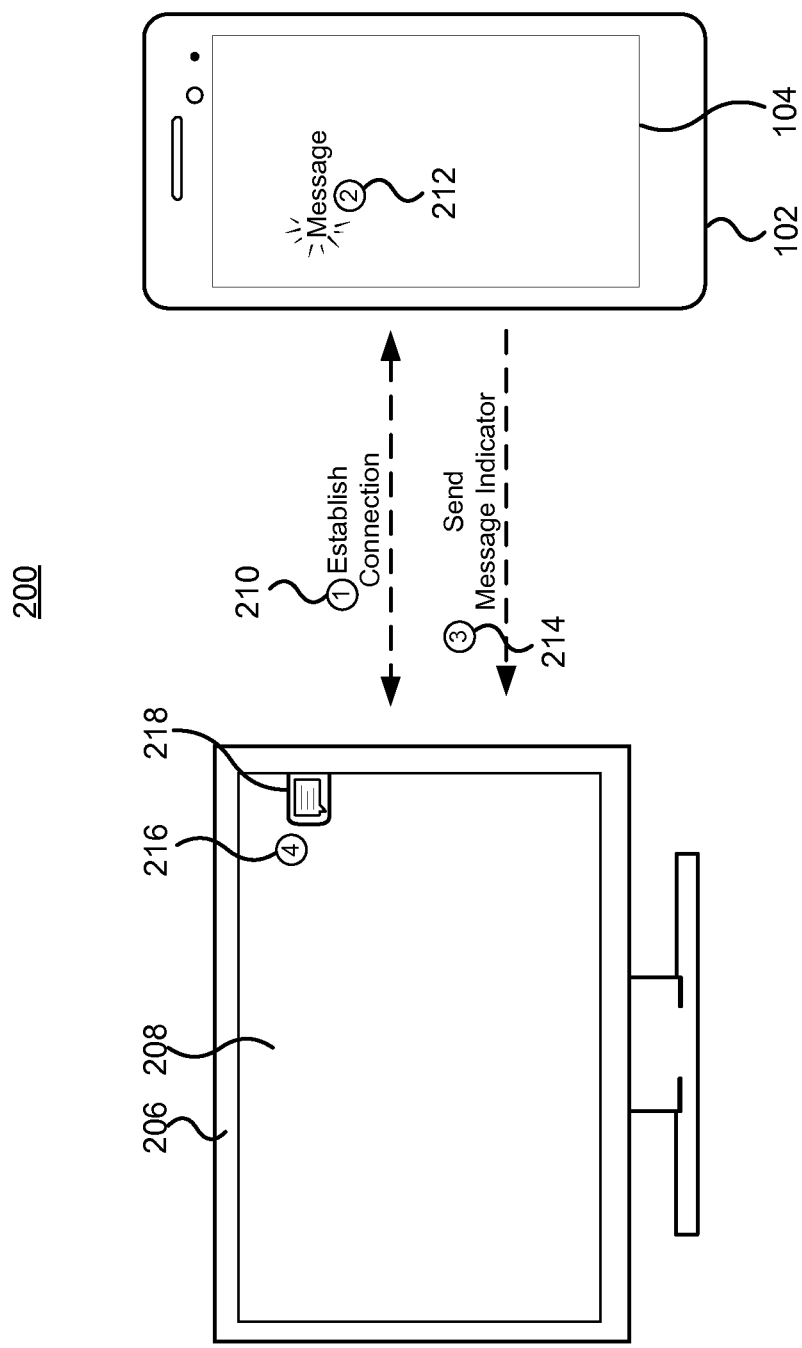
FIG. 2 depicts the process for generating message notifications at a computing device for messages received at a mobile device.

FIG. 2 depicts the process for generating message notifications at a computing device for messages received at a mobile device. The system 200 comprises a mobile device 102 and a second computer device 206. The mobile device 102 can receive messages and provide notifications on the display 104. The mobile device 102 can connect to a second computer 206, depicted as an all-in-one computer although other types of computing devices are contemplated, and use the display 208 of the second computer to present a notification of the message received on the mobile device 102.

When the mobile device 102 is in proximity to the second computer 206 a connection may be established 210 between the two devices. The connection can be established using various communication techniques, to create local area networks (LAN) or personal area networks (PAN) including a USB connection, a Bluetooth connection, a Wi-Fi connection, a ZigBee connection or other wired or wireless connections. A message 212 is received at the mobile device. The mobile device can generate a notification for the message as well as a direct action area as described above with regard to FIG. 1. If the mobile device 102 has established a connection to the second computer 206, a message indicator can be sent 214 from the mobile device to the second computer. The message indicator can be received at the second computer 216 and a notification representation 218 of the message indicator displayed to the user. As depicted, the notification representation 218 may be a small graphical icon or other unobtrusive indicator. As described further below, a user of the second computing device 206 may interact with the notification representation, which may for example expand the graphical representation to allow the user to take a direct action from the notification representation.

Figure 3:
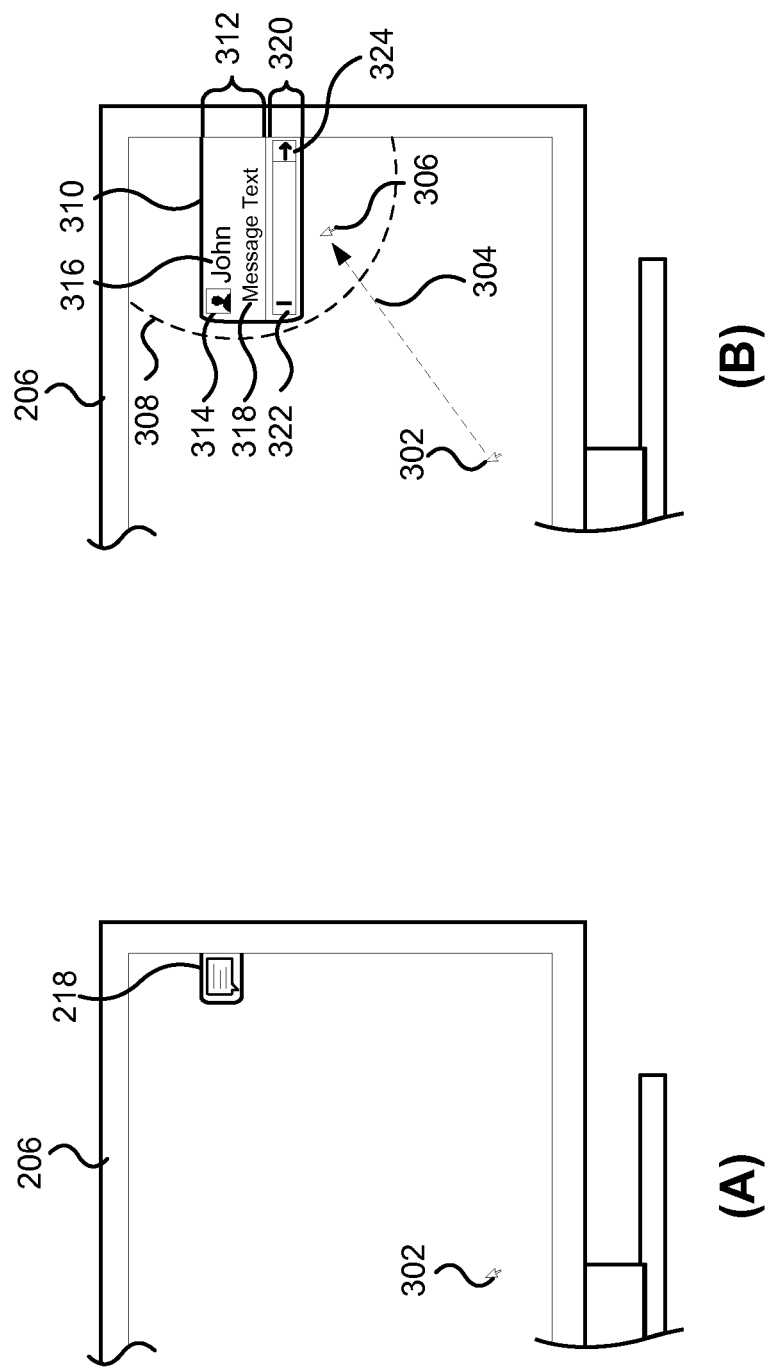
FIG. 3 depicts interacting with a display representation of a message indicator received from a mobile device.

FIGS. 3A and 3B depicts interacting with a notification representation of a message indicator received from a mobile device. As depicted in section (A) of FIG. 3, a message indicator has been received at the second computing device 206 from a mobile device 102 and a first notification representation 218 of the message indicator is displayed. Positioning information can be received from an input component, which is depicted graphically as pointer 302 in FIG. 3.

The input component, graphically represented as pointer position 302, can be moved toward the graphical representation 218 to a location 306 as depicted by dashed arrow 304 in section (B) of FIG. 3. The positioning information associated with the second pointer position 306 is within a display area surrounding the notification representation, represented by dashed line 308. When the positioning information 306 is within the display area 308 a second notification representation 310 of the message indicator may be presented on the second display. As depicted, the second notification representation 310 may comprise a message portion 312 that may display a graphical icon 314 indicative of a sender of the message, or a message channel of the message. The message portion 312 may further comprise a name portion 316 displaying a name associated with the sender of the message as well as a message body 318 displaying at least a portion of the message, such as the body of an e-mail or text message. The notification representation 310 also includes a direct action area 320 that allows a user to take a direct action associated with the message, such as replying to the message. The direct action area 320 may comprise a text box 322 for inputting a reply text as well as an action button 324 for carrying out the direct action. Although depicted as a direct action button 324, a button may not be necessary for performing the direct action. For example, sending the reply to the message may occur when a user hits enter. Regardless of if a direct action button is present or not, an input selection is received, such as pressing the direct action button or hitting enter, that causes the associated direct action to occur. Further, although only a single direct action has been described, it is contemplated that a plurality of direct actions may be presented to the user. For example the input selection may also include the ability to share the message with one or more additional contacts. Alternatively, the direct action may also provide the ability to share a message with other contacts and not reply to the message in the instance that notification is broadcast type message. When multiple direct actions are presented, the input selection may select which of the direct actions to perform.

As depicted in FIG. 3, a notification representation used to notify a user of a message received on the mobile device may be adjusted based on input, such as mouse movement, from a user. As depicted, a first notification representation 218 may provide a small notification that does not distract the user or interfere with work currently being performed. If the user wishes to determine more information associated with the displayed notification, they are able to move a pointer towards the notification representation, which will expand to display information associated with the message as well as provide an option for taking a direct action associated with the message of the notification.

Figure 4:
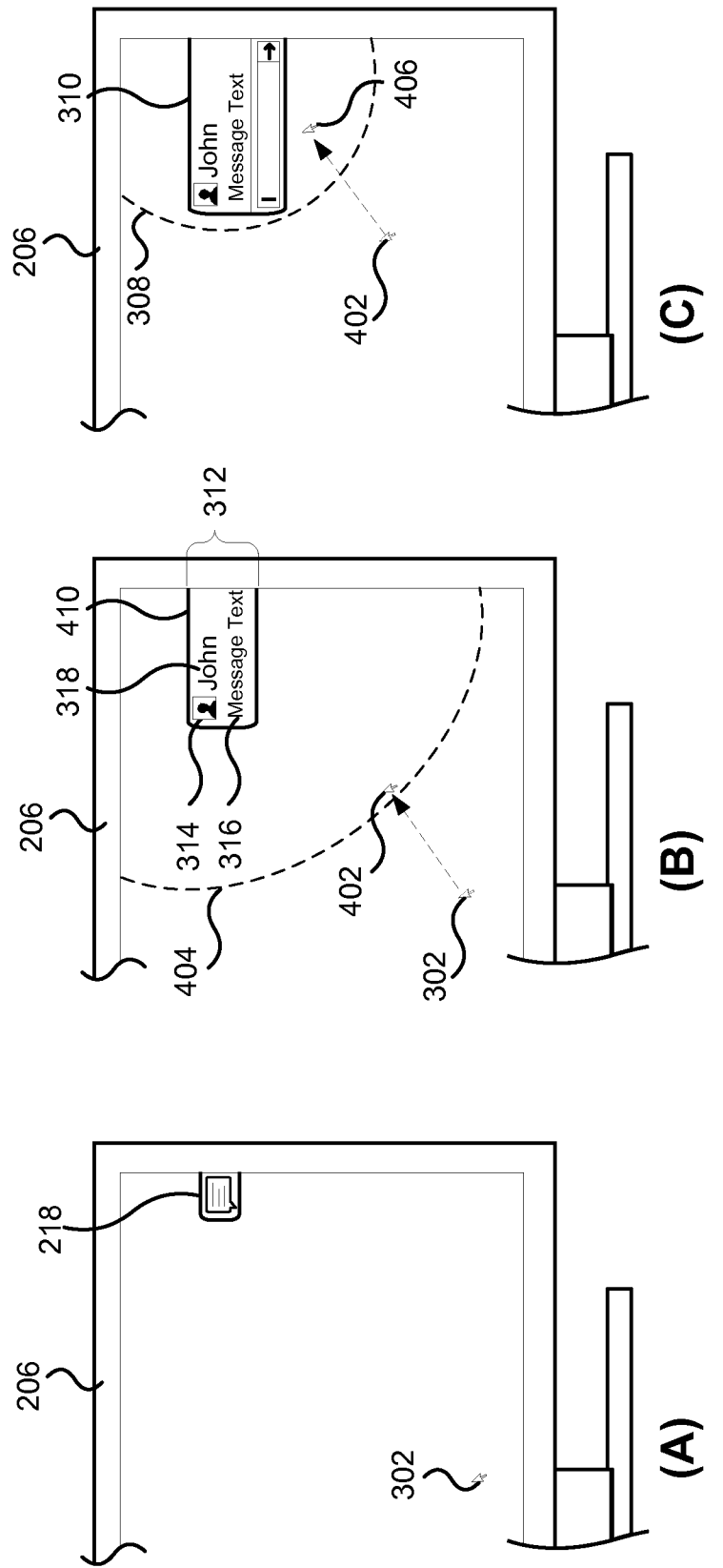
FIGS. 4A to 4C depicts interacting with a display representation of a message indicator received from a mobile device.
Figure 5:
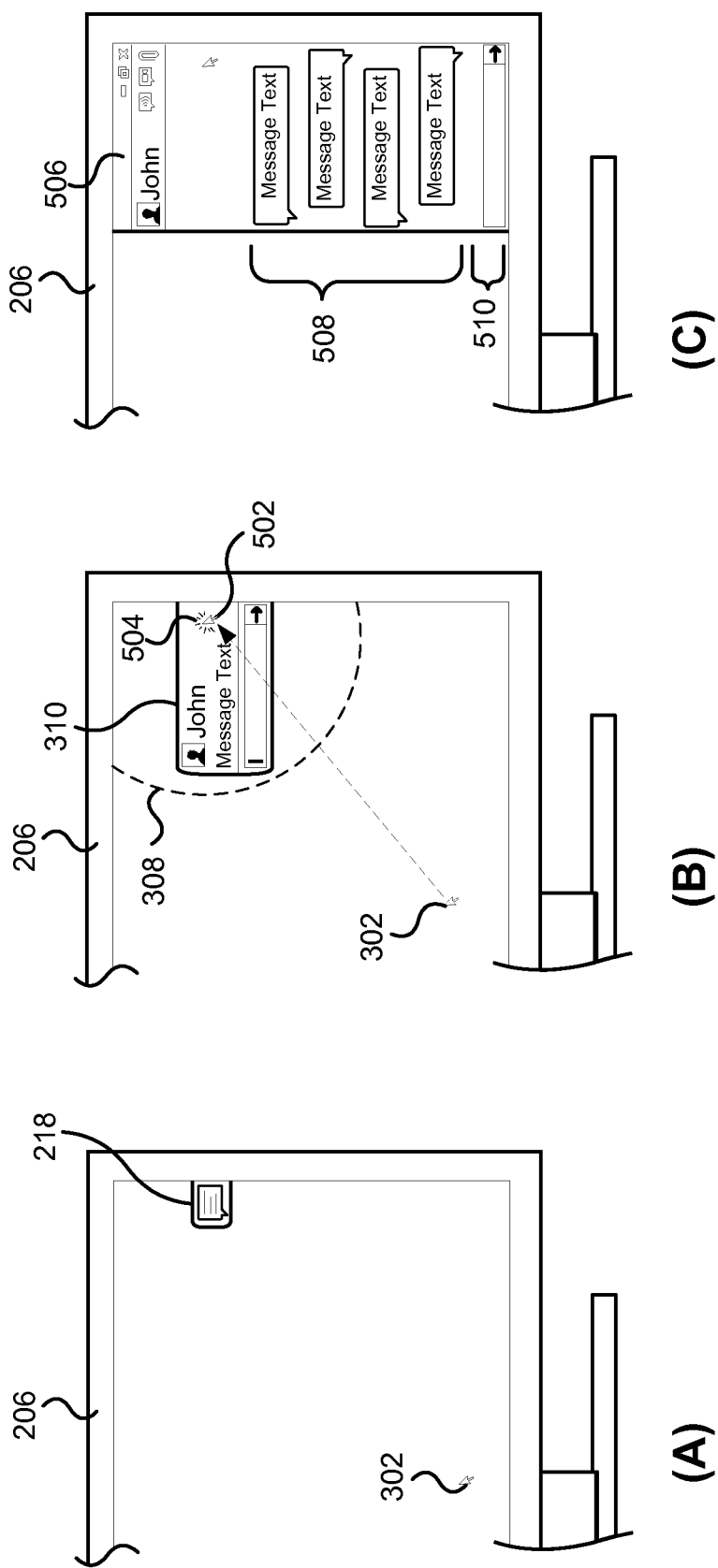
FIG. 5A to 5C depicts interacting with a display representation of a message indicator received from a mobile device.

FIGS. 4A to 4C depicts interacting with a notification representation of a message indicator received from a mobile device. The interaction depicted in FIG. 4 is similar to the interaction depicted in FIG. 3; however, it includes an additional intermediary notification representation of the message indicator. As depicted in section (A) of FIG. 4, a message indicator has been received at the second computing device from a mobile device and a first notification representation 218 of the message indicator is displayed. Positioning information can be received from an input component, which is depicted graphically as pointer 302. A user of the second device 206 can use an input component to move the pointer 302 to a second position 402. If the positioning information associated with position 402 is within an intermediary display area, depicted by dashed line 404, the notification representation of the message indicator can be changed to a second notification representation 410 of the message indicator. The second display notification 410 may comprise a message portion 312, as described above, that may display a graphical icon 314 indicative of a sender of the message, or a message channel of the message. The message portion 312 may further comprise a name portion 316 displaying a name associated with the sender of the message as well as a message body 318 displaying at least a portion of the message, such as the body of an e-mail or text message.

The user may continue moving the pointer toward the display notification from position 402 to position 406. If the position 406 is within a direct action area depicted by dashed line 308, the notification representation 310 that includes a direct action area as described above with regard to FIG. 3.

As depicted in FIG. 4, a notification representation of a message may initially be small and unobtrusive so as not to distract the user. If the user wishes to see more information associated with the message, the pointer can be moved toward the notification representation, which can change to display additional information. If the user wishes to take a direct action associated with the message, they can continue moving the pointer toward the representation and once the pointer is within an area associated with displaying the direct action, the notification representation can be changed to include a direct action area. Accordingly, a user can control the amount of information about a message received at the mobile device that is revealed on a second device.

FIGS. 5A to 5C depicts interacting with a notification representation of a message indicator received from a mobile device. As depicted, an initial notification representation 218 is displayed and a user moves a pointer from a first position 302 to a second position 502. The second position 502 is within the direct action notification area 308 and as such, the notification representation 310 is presented on the display. The user may click 504 on the message portion of the notification representation 310. Clicking on the message portion causes an application associated with the message to be displayed 506. The message application 506 may display the communication history of a conversation 508 as well as provide an area for sending a new message to the other participants in the conversation.

As described above, a message can be received at a mobile device, such as a mobile phone, and a notification can be presented on the display of a second device coupled to the mobile device. The amount of information displayed for the notification on the mobile device can be controlled by the user.

Figure 6:
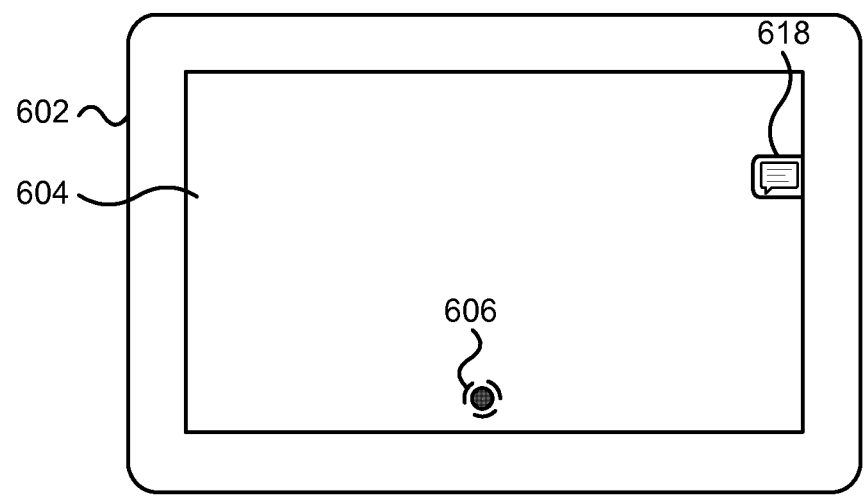
FIG. 6A to 6C depicts interacting with a display representation of a message indicator received from a mobile device.
Figure 6:
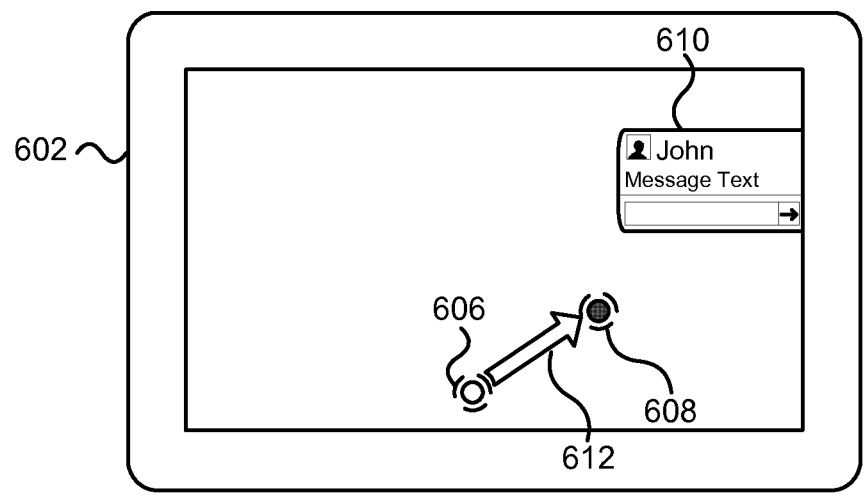
Figure 6:
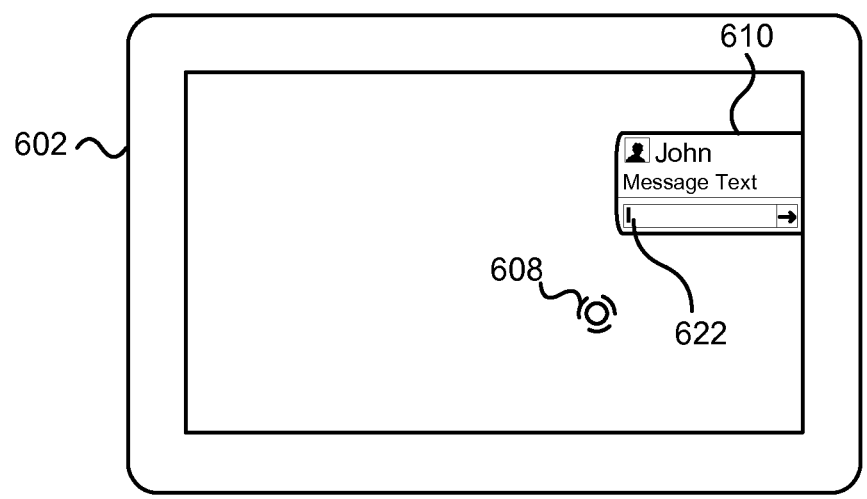

FIGS. 6A to 6C depicts interacting with a notification representation of a message indicator received from a mobile device. The second computing device of FIG. 6 is depicted as a tablet type device 602 that includes a touch sensitive display 604 as the input component. A message indicator can be received at the tablet 602 and a notification representation 618 presented to the user. As described above with reference to FIGS. 3 to 5, different notification representation 618, 610 can be displayed. The user may initiate a gesture by touching the screen at a first location 606; the touch-based gesture may comprise dragging or swiping towards a second location 608. The gesture 612 may cause the notification representation 618 to expand and display a more detailed notification representation of the message, possibly including a direct action area. The gesture 612 may be compared to display criteria, which may include a direction of the gesture, the end location of the gesture, display time threshold, and/or the speed of the gesture in determining if the notification representation should be changed. If the swipe gesture 612 causes the notification representation 610 to be displayed including a direct action area, ending the gesture by lifting the figure at position 608 may cause the focus to switch to input box 622 allowing a user to input text once the gesture is completed.

Figure 7:
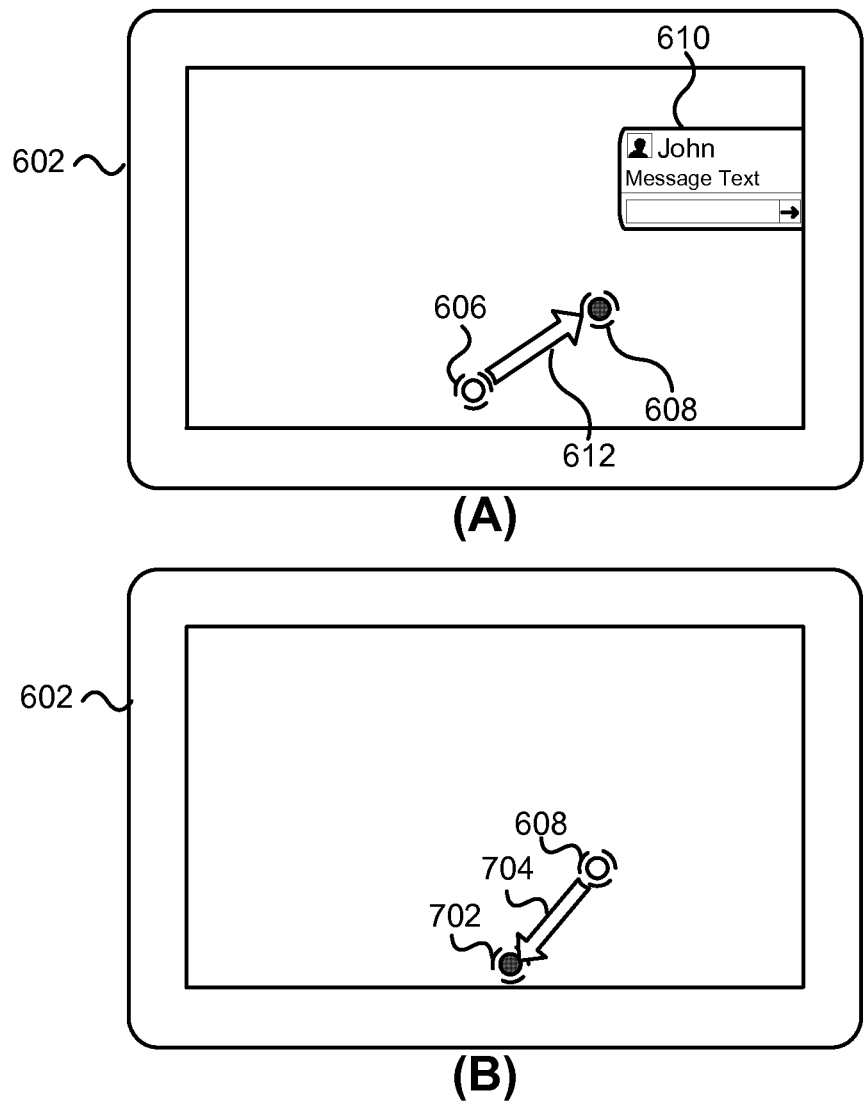
FIGS. 7A and 7B depicts interacting with a display representation of a message indicator received from a mobile device.

FIG. 7 depicts interacting with a notification representation of a message indicator received from a mobile device.

The depicted interaction is similar to that described above with regard to FIG. 6. A message indicator is received and initially displayed. A gesture 612 starting at a first position 606 and ending at a second location position 608 causes a notification representation 610 to be presented. In contrast to FIG. 6, in which it is assumed that the user lifts their finger at location 608, FIG. 7 depicts a further swipe gesture starting at the location 608 and ending at location 702. The gesture 704 may be considered as the reverse of gesture 612 and causes the notification representation to disappear.

In addition to using a gesture or other input to cause a displayed notification representation to disappear, it is possible for a display representation to disappear after a period of time has passed and no gesture or input has been received. Additionally or alternatively, a displayed notification may require user interaction in order to not be displayed. For example, a notification representation of a missed telephone call may be displayed as a 'sticky' notification which remains until a user interacts with it. Whether or not a notification representation should be displayed until an interaction has occurred may be determined based on the type of message, properties of the message such as a priority level as well as user settings. As a further example, a notification representation of a regular email message may be displayed for a set period of time after which it disappears if no interaction is received. A notification representation of a high priority email message may be displayed until a user expressly interacts with the display representation.

Figure 8:
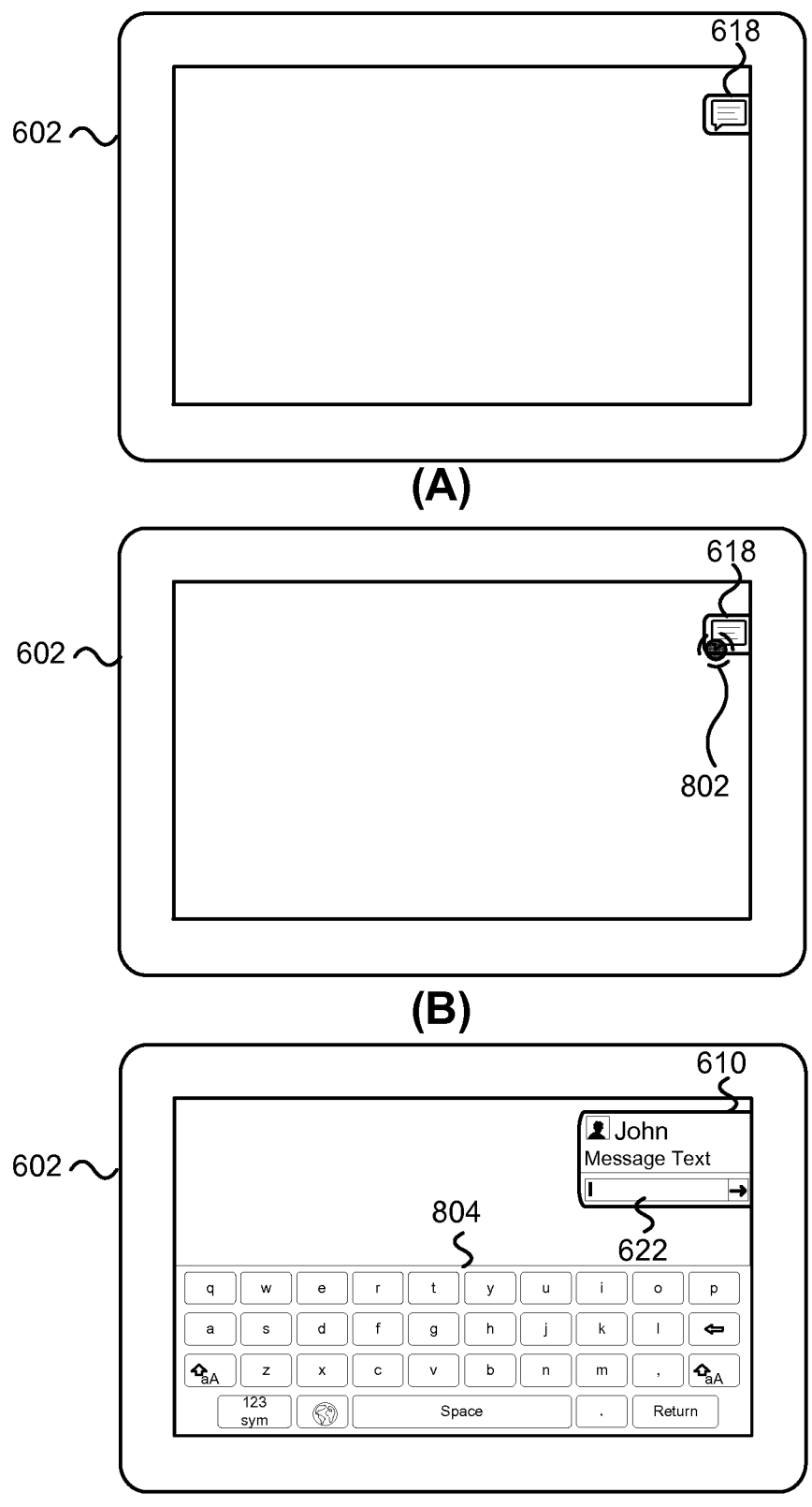
FIG. 8A to 8C depicts interacting with a display representation of a message indicator received from a mobile device.
Figure 9:
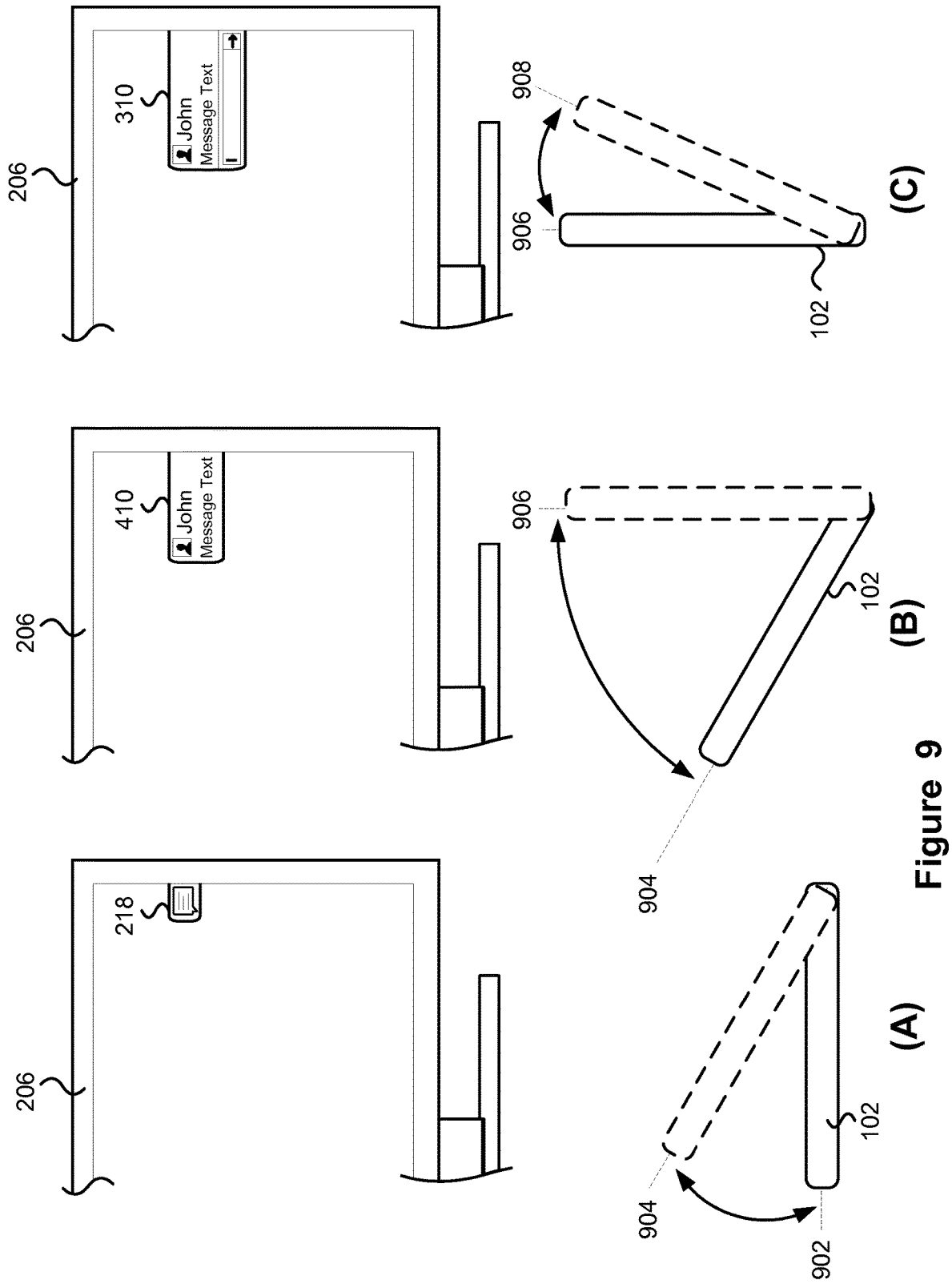
FIG. 9A to 9C depicts interacting with a display representation of a message indicator received from a mobile device.

FIGS. 8A to 8C depicts interacting with a notification representation of a message indicator received from a mobile device. The interaction depicted in FIG. 8 does not rely upon a swipe gesture. Rather when an initial notification representation of the message indicator is presented 618, the user may tap 802 on the notification representation, causing another notification representation 610, including message and direct action portions to be presented. Once presented, the focus may be placed on the text input area 622, and a virtual keyboard 804 displayed on screen allowing the user to enter text into the reply area.

FIGS. 9A to 9C depicts interacting with a notification representation of a message indicator received from a mobile device. The above description has described using an input component for controlling the notification representations associated with a message. The input component may also be provided by the mobile device 102 itself. The mobile device may include one or more sensors for determining its orientation and movement. Each of the different notification representations 218, 310, 410 may be associated with a range of positions of the mobile device.

As depicted, the mobile device 102 may be rotated from a horizontal position 902 to different positions. When a notification is presented on the display, the notification representation to present may be determined based on the position of the mobile device. As depicted if the mobile device 102 is positioned between a horizontal position and a second angular position 904 the notification representation 218, which displays a small graphical icon, can be displayed. As the mobile device is rotated between the second angular position 904 and a third angular position 906, a second notification representation 410 that presents at least a portion of the associated message is displayed. If the mobile device continues to be rotated past the third angular position 908 to a fourth angular position 908, the notification representation 310 may be presented on the display that includes at least a portion of the message as well as a direct action area allowing a user to carry out a direct action associated with the message. It will be appreciated that the particular angles defining the angular positions 902, 904, 906, 908 may vary and may be set by the user of the mobile device.

The above has described displaying notifications received at a mobile device on a display of a second computing device that is communicatively coupled to the mobile device. The notification may have various notification representations, including a notification representation that includes a direct action area. By allowing the user to control, through an input component, which of the notification representations are presented the presentation of the notifications may be improved.

As described further below, in addition to controlling when the display representation that includes a direct action area is displayed, it may be desirable to control which of the messages are notified to the user. For example, regardless of the notification representation used for the notification on the second device, a message notification received from the mobile device may be processed to determine if it should be displayed based on the current computing context. The current computing context may include various factors, such as what applications are running, what applications are currently displayed, networks the computing device is connected to as well as other factors such as preference settings.

Figure 10:
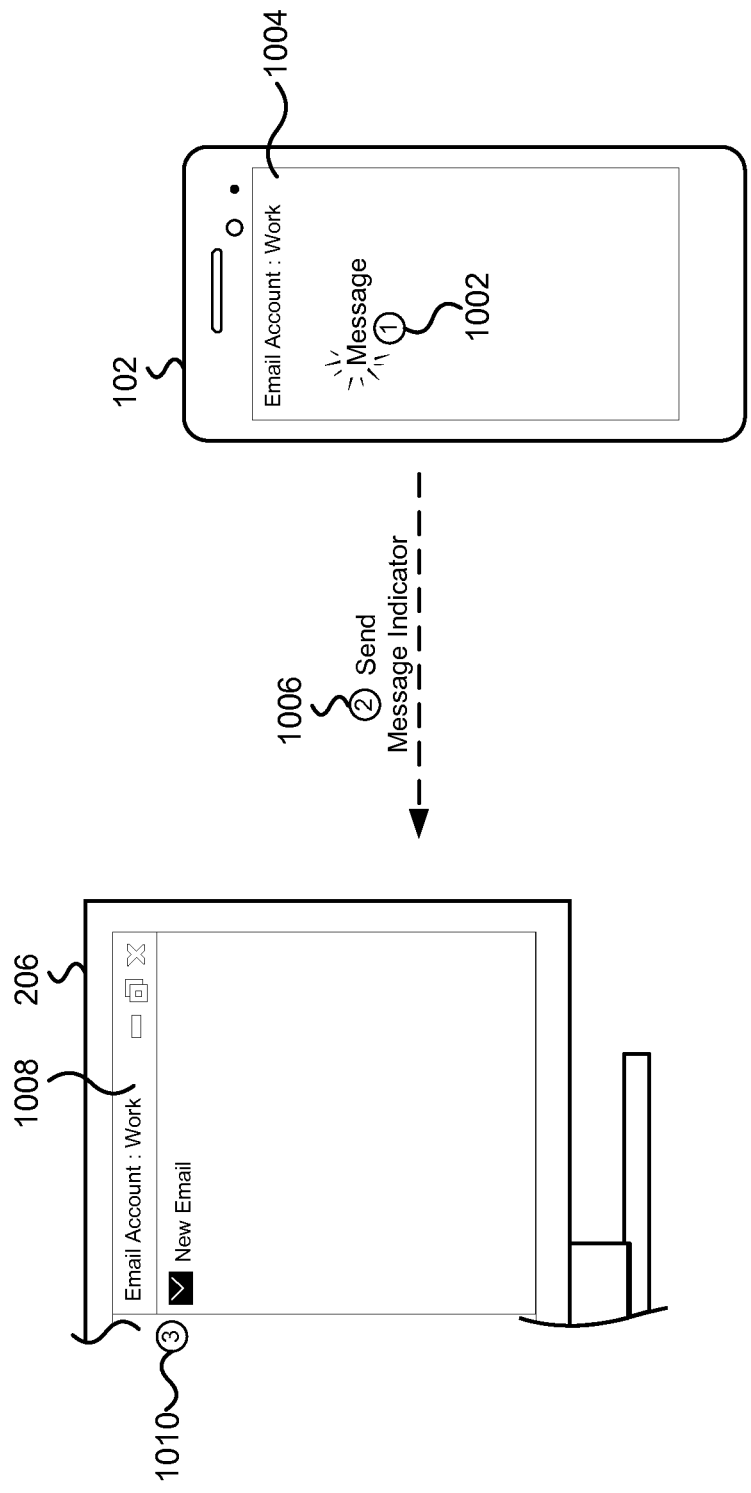
FIG. 10 depicts processing notifications received from a mobile device for display.

FIG. 10 depicts processing notifications received from a mobile device for display. As depicted in FIG. 10, a message 1002 is received for an account, depicted as being a work e-mail account 1004, on the mobile device 102. As described above, the mobile device 102 may send a message indicator 1006 to a second computing device 206. The second computing device 206 is running an e-mail program 1008 for the work account. Accordingly the message that was received at the mobile device is also received at the second computing device and displayed 1010.

When the message indicator 1006 is received at the computing device 206 the computing device processes the message indicator based on the computing context. In FIG. 10, it is contemplated that the computing context includes that the computing device is running an e-mail program for an e-mail account, and the user has set preferences indicating that notifications should not be presented if the message is associated with an e-mail account displayed in a currently running e-mail application. When the message indicator 1006 is received, it is processed and it is determined that the message indicator is associated with a message for the work e-mail account that is displayed by the e-mail application 1006. Accordingly, the received message indicator is not presented to the user.

Figure 11:
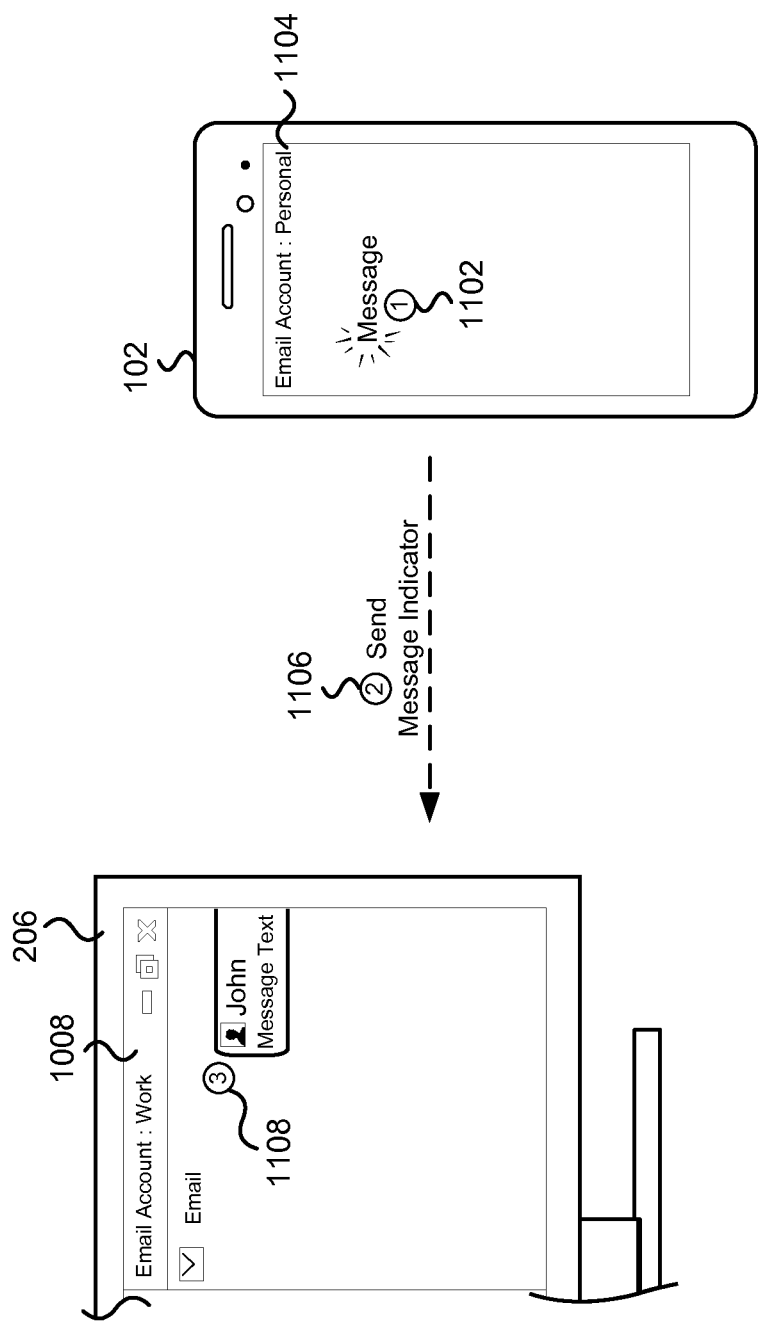
FIG. 11 depicts processing notifications received from a mobile device for display.

FIG. 11 depicts processing notifications received from a mobile device for display. The depiction in FIG. 11 is similar to that of FIG. 10; however, a notification representation of the message indicator is presented to the user. A message 1102 is received at the mobile device 102 for a personal e-mail account 1104. The mobile device 102 sends a message indictor 1106 to a second computing device 206 that is communicatively coupled with the mobile device 102. The message indicator 1106 is processed at the computing device 206, which determines that the message indicator is associated with a message for an account that is not associated with the work e-mail program 1006. Accordingly, the processing determines that a notification representation for the message should be presented to the user and presents the notification representation accordingly 1108. The notification representation may be displayed and controlled in accordance with the description of the position based action notification described above. Additionally or alternatively, the notification may be a static notification representation.

As described above with reference to FIG. 10 and FIG. 11, when a message indicator is received that is associated with an account of an application currently running on the second device 206, a notification representation of the message indicator is not presented on the display. If however, the message indicator is not associated with an account of a running application, the notification representation may be presented to the user on the display.

Figure 12:
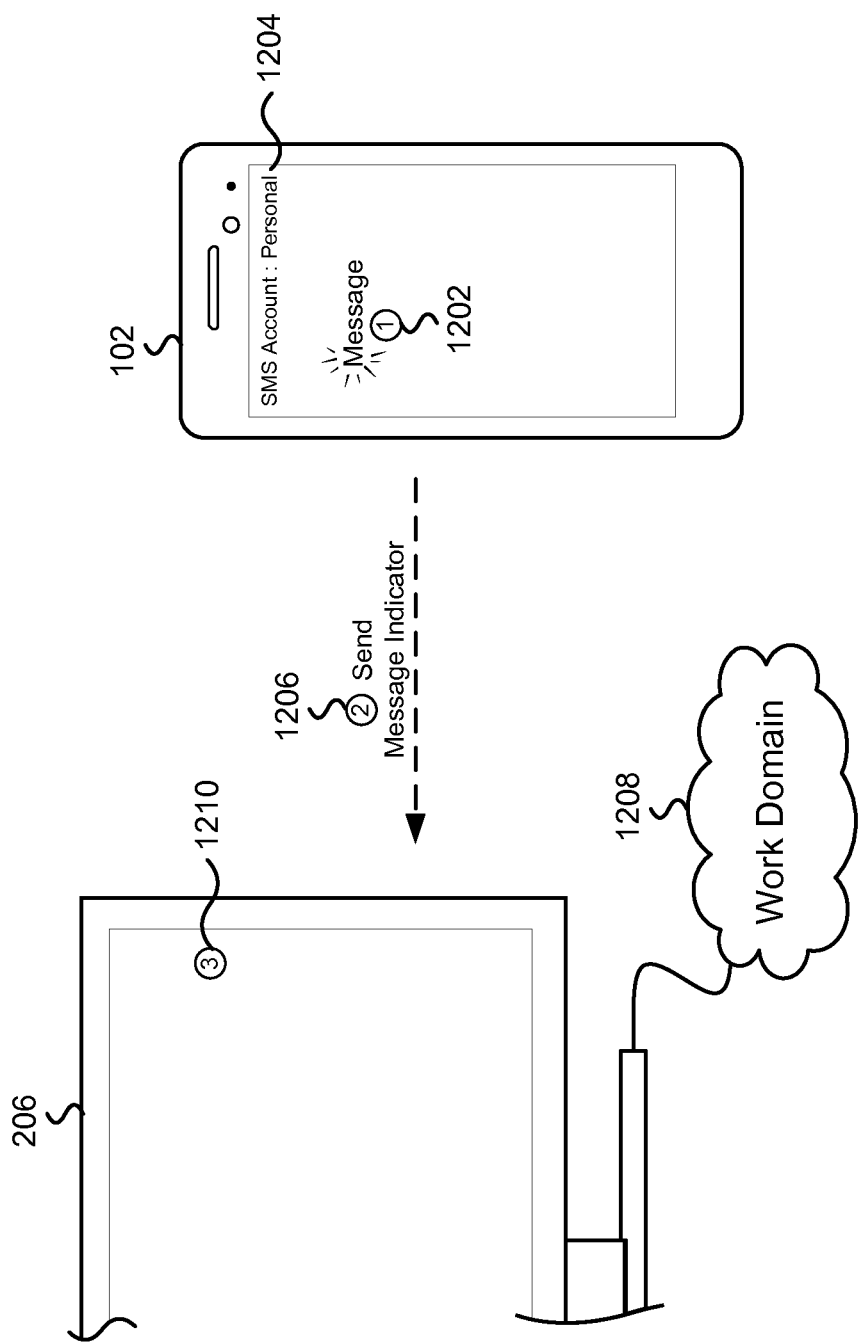
FIG. 12 further depicts processing notifications received from a mobile device for display.
Figure 13:
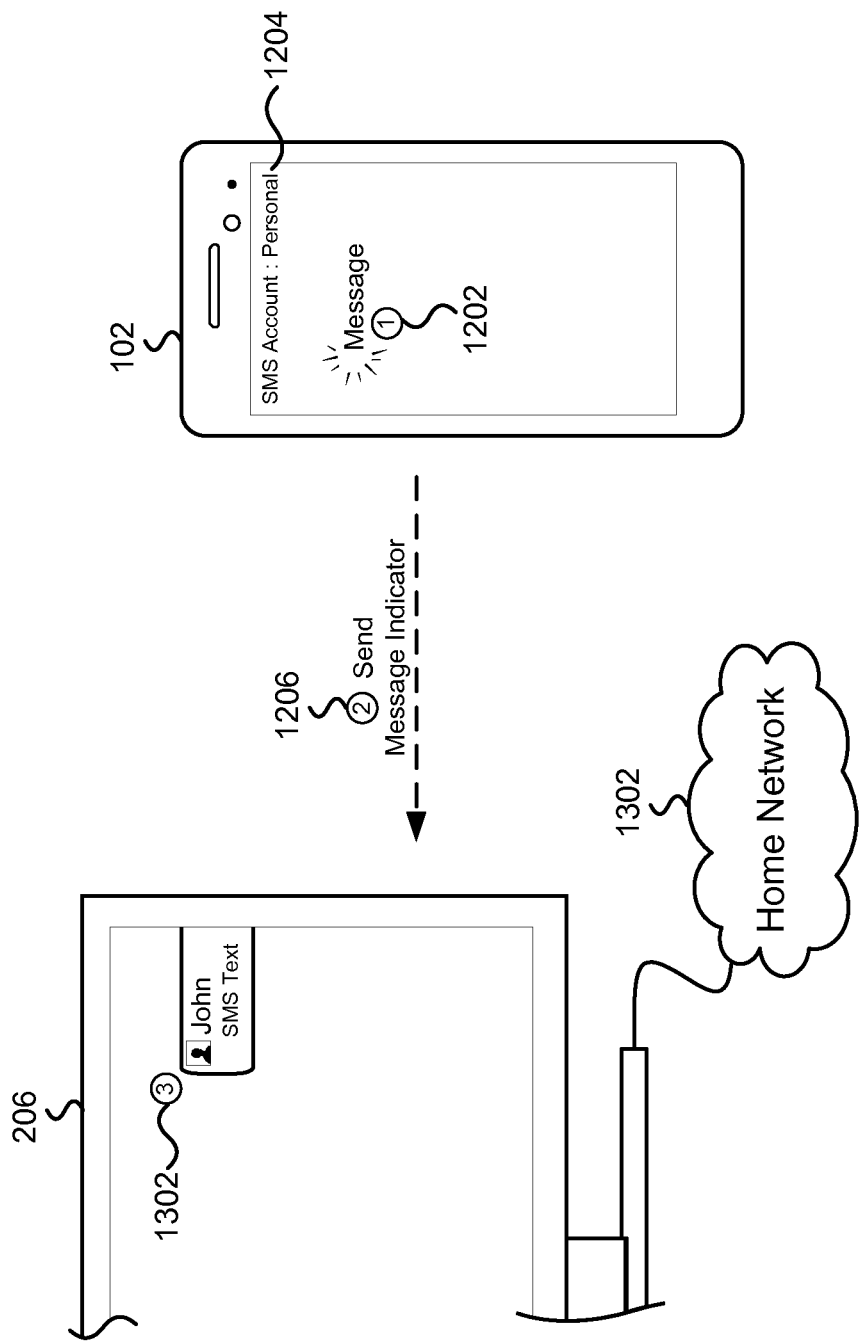
FIG. 13 further depicts processing notifications received from a mobile device for display.

FIGS. 12 and 13 further depict processing message indicators received from a mobile device for display. In FIGS. 11 and 12 a notification for a received SMS message is not displayed when the second computer is connected to a work domain, while a notification for a received SMS message is displayed when the second computing device is not connected to the work domain. As such, the context based display of notifications can allow notifications associated with personal accounts to only be displayed when not at work.

As depicted in FIG. 12, a message 1202 is received for a personal SMS account 1204. The mobile device 102 sends the message indicator 1206 to the second computing device 206 which receives the message indicator and processes it. The second computing device 206 is connected to a work domain 1208, and as such, a notification representation of the received message indicator for the personal SMS message is not presented on the display 1210. The determination that the second computing device 206 is connected to the work domain may be determined based upon network characteristics such as Internet Protocol (IP) address, domain registration, logon credentials, and access network or gateway/proxy configuration.

In contrast to FIG. 12, the second computing device 206 of FIG. 13 is connected to a home network 1302. As such, when the message indicator 1206 for the personal SMS message is received, notification representation of the received message indicator 1302 is presented to the user.

As described above with regard to FIGS. 10-13, it is possible to control which notifications are displayed on a second computing device based on a current operating context. Rules or preferences may be specified in notification display settings that specify which message notifications should be displayed based on particular operating contexts. The operating context may specify one or more criteria such as what applications are running, currently visible applications, current time, a time of day, a day of the week, a current location of the portable device or computing device, as well as networks connected to the portable device or computing device.

Although described above as determining what notifications should be displayed on a second device, it is contemplated that the same context-based processing may be used in determining what notifications should be displayed in the mobile device.

The message indicator sent from the mobile device to the second computing device may comprise various characteristics depending upon the type of message. For example, the characteristics of the message indicators may include information on a sender and receiver of the message, a message subject, a message body, a messaging application, and a time the message was sent and/or received.

Figure 14:
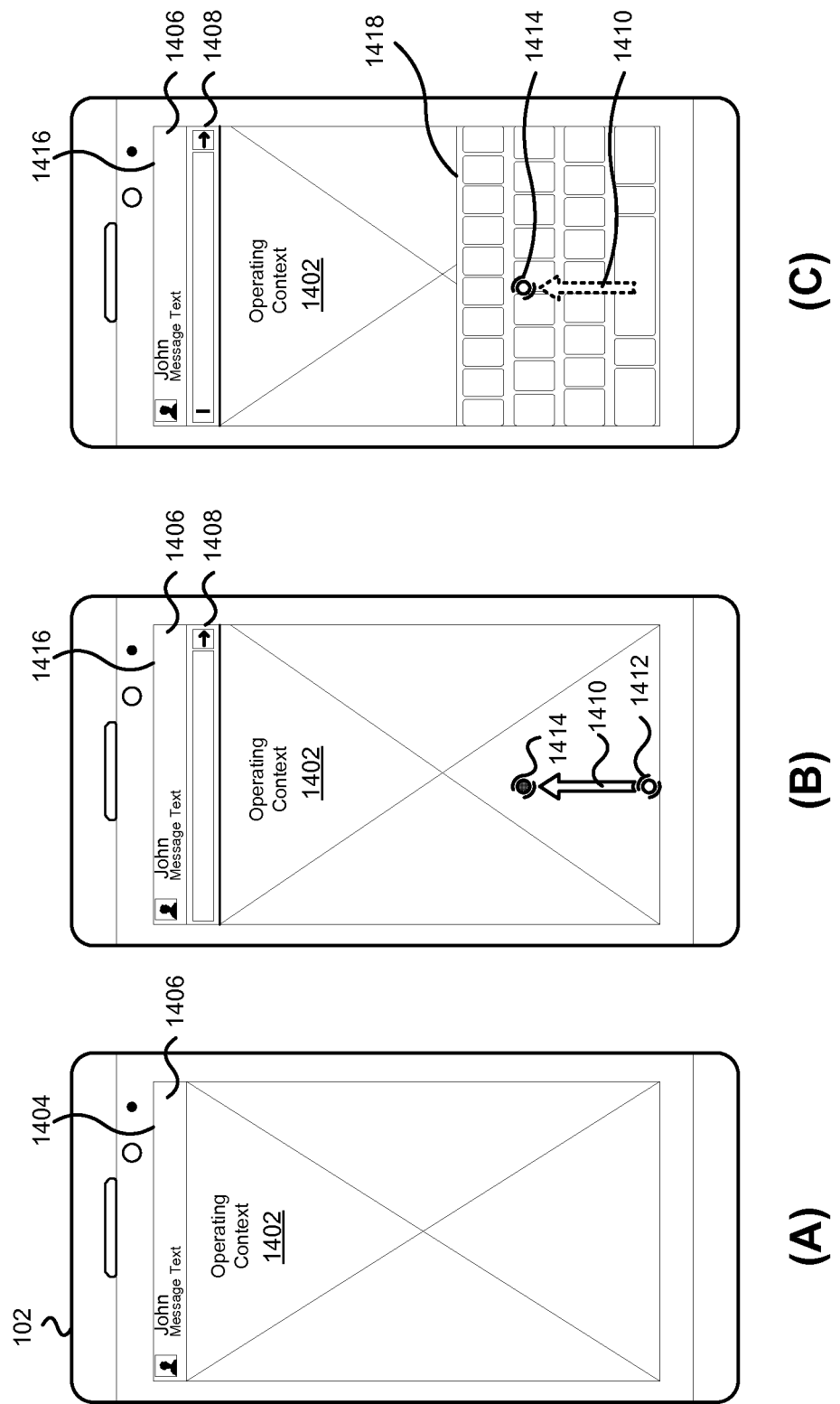
FIG. 14A to 14C depicts processing notifications received at a mobile device.

FIG. 14 depicts processing notifications received at a mobile device. As described above with regard to FIG. 1, a notification for a received message may be displayed on the mobile device 102. The notification may include a direct action area as described above. Further, the display of the notification may be based on position information related to a gesture performed on the device. Additionally, the presentation of the different notification representations can be controlled based on a current operating context of the mobile device.

As shown in FIG. 14(A) When a message is received at a mobile device 102, the operating context 1402 the device is determined. The operating context 1402 may be specified by one or more of the applications currently running, messaging application or communication channel. The determined operating context is used to determine notification display settings that specify, among other settings, whether a notification representation should be presented to the user or suppressed. When a message is received, if it is determined that a notification representation should be presented based on the operating context, a first notification representation 1404 of the message may be displayed. The first notification representation 1404 may present message information 1406, such as a name of the sender and a portion of the message text, in a banner of the user interface. As shown in FIG. 14(B) when the first notification representation 1404 is displayed a user may perform a gesture 1410, for example by swiping one or more fingers from a first location 1412 to a second location 1414 to form the gesture. The gesture information may satisfy gesture criteria associated with a second notification representation of the message. If the information of the gesture 1410 does satisfy an associated display criteria, for example the swipe was in the correct general direction, was long enough and/or was fast enough, the second notification representation 1416 may include the message information 1406 displayed as the first notification representation as well as a direct action area 1408 that allows a user to perform an action associated with the message without requiring the user to execute the messaging application. The direct action area 1408 is depicted as a text input box and a direct action button, although as described above, the direct action button is not required as other input selections may cause the action to be performed. Once the second notification representation 1416 is displayed, if the user lifts their finger from the location 1414, the focus may be switched to the text input box of the direct action area 1408 and a keyboard 1418 as shown in FIG. 14C can be displayed to allow the user to input text associated with the direct action of the notification representation.

Figure 15:
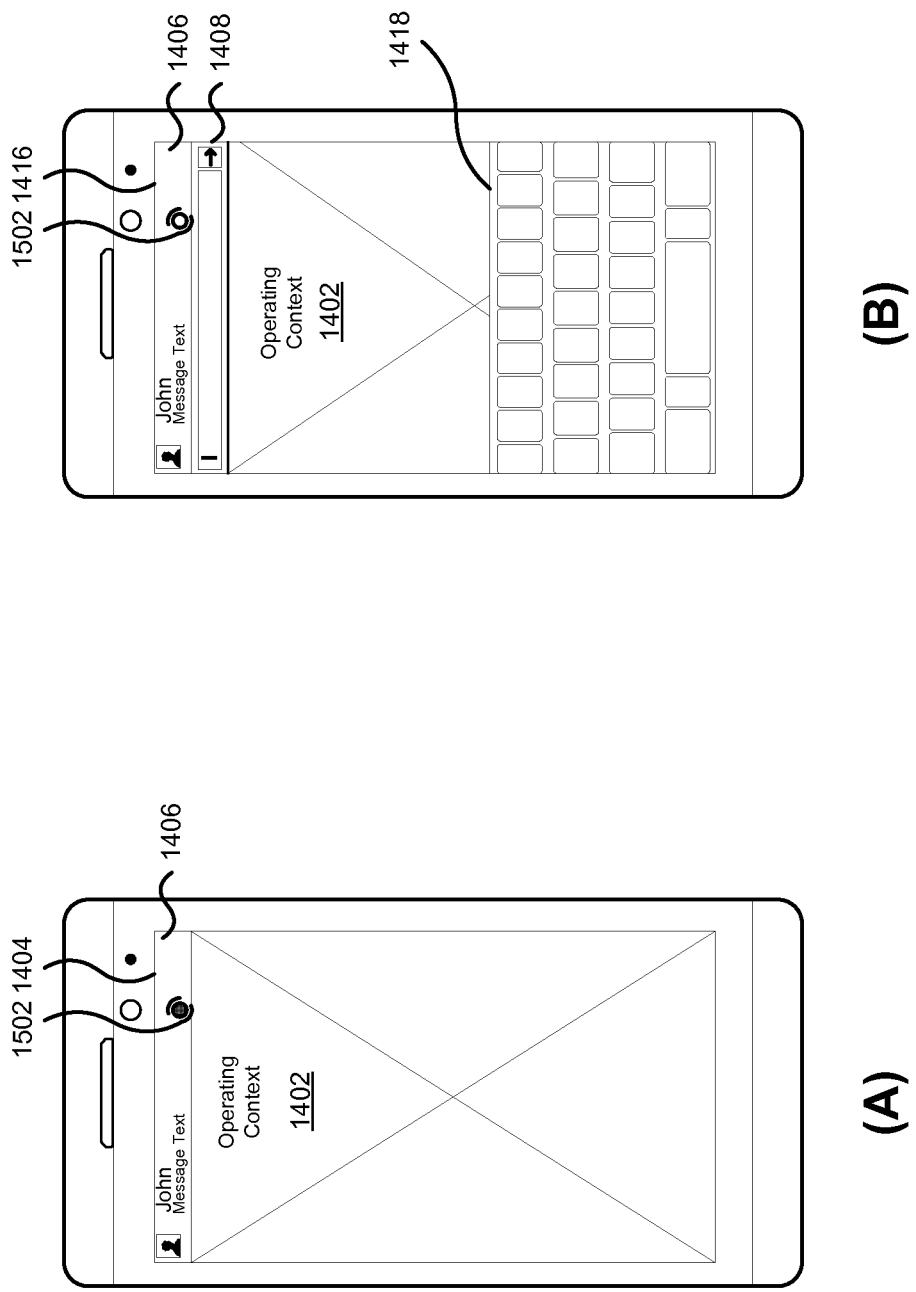
FIG. 15A to 15B depicts processing notifications received at a mobile device.

FIG. 15 depicts processing notifications received at a mobile device. The notification processing of FIG. 15 is similar to that of FIG. 14; however, instead of a swipe based gesture displaying a second notification representation, the gesture is a tap gesture 1502 as shown in FIG. 15(A). When the first notification representation 1404 of the message is displayed, the user may tap 1502 the representation, which causes the second notification representation, including the direct action area to be displayed. When the direct action area 1408 is displayed, the focus may be set to the text input box and a keyboard 1418 displayed as shown in FIG. 15(B).

Figure 16:
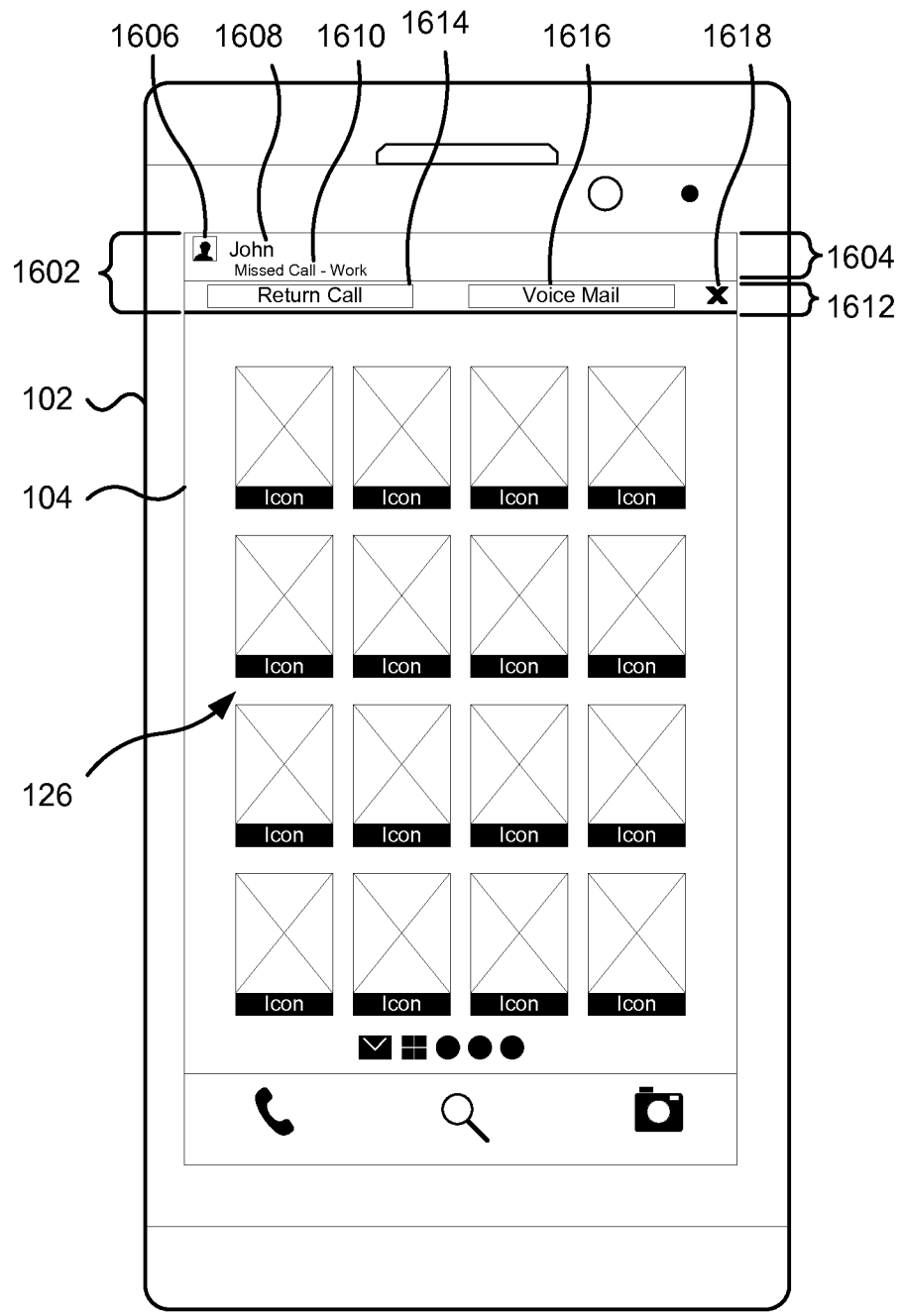
FIG. 16 depicts displaying a notification representation based on an operating context of a mobile device

FIG. 16 depicts displaying a notification representation based on an operating context of a mobile device. The mobile device 102 includes a display 104 that presents a user interface 126 to the user. Messages may be presented to the user in various notification representations. The display representation may be based on a current operating context of the mobile device. The operating context may include information on which applications are currently executing, which applications are currently visible, a current time, network connection information as well as location information. The messages may include messages sent to the mobile device such as e-mails, SMS messages, an instant messaging application, or push-based messages such as sports scores, news alerts, stock prices, etc. Additionally, the messages may be generated by the mobile device 102. An application may generate a message in order to notify the user about an event. For example, a message may be generated when the user misses a telephone call, or video call.

A notification representation 1602 is presented to the user informing the user of a missed call. The notification representation 1602 may be presented based on the operating context of the mobile device. For example, if the mobile device is at a location associated with work, the notification may not be presented to the user, assuming that the missed call was on a personal line. If display settings associated with the current operating context indicate that the notification representation 1602 should be displayed, it is presented to the user as depicted in FIG. 16. The notification representation 1602 may comprise a message portion 1604 that displays message related information such as an image 1606 associated with the message or caller, a name 1608 of a sender of the message or caller and message details 1610 such as message text or an indication of the missed call. The notification representation 1602 may further comprise a direct action area 1612 that presents the user with actions that can be performed directly from the notification representation. The particular direct actions may be based on the type of the message. For example, if the message is an e-mail, the direct action may present a text box for replying to the e-mail. In the case of a missed phone call, the direct action area 1612 may present the user with actions for returning the call 1616 and/or calling a voice mail number 1618. The direct action area 1612 may be initially presented with the message portion 1604, or alternatively may be presented to the user based on a gesture or other input information as described in relation to FIGS. 14 and 15.

Figure 17:
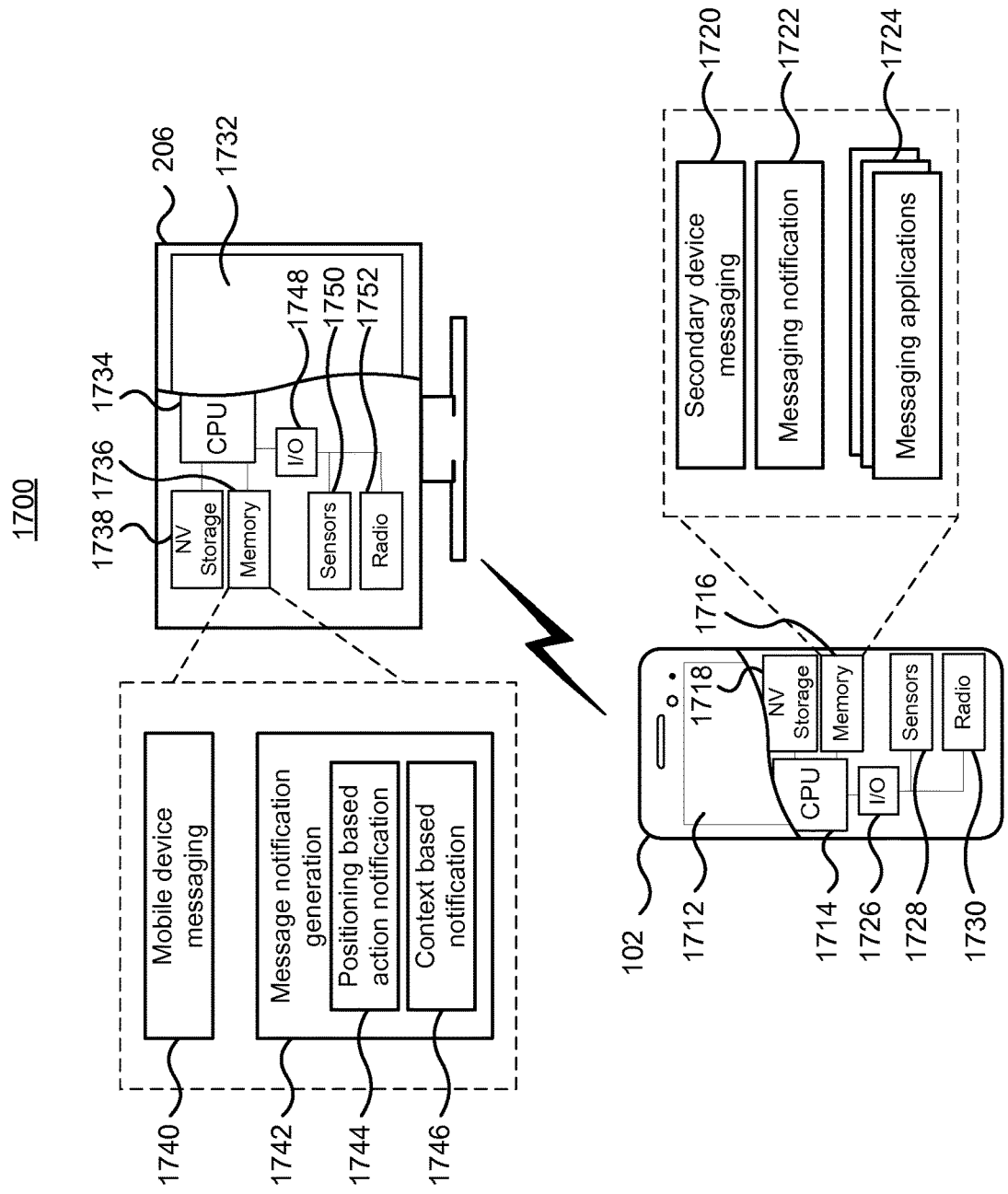
FIG. 17 depicts a system for generating display representations of notifications received by a mobile device.

FIG. 17 depicts a system for generating notification representations of message indicators received by a mobile device. The system 1700 comprises a mobile device 206 which may be, for example a cellular phone, smartphone, or tablet and a second computing device 206, which may be a tablet, desktop computer, all-in-one computer as depicted or a laptop computer. The second computing device 206 is generally considered to be a computing device having a larger display than the mobile device 102.

The mobile device 102 comprises a display screen 1712, which may include a touch screen. The mobile device 102 comprises a processor 1714 for executing instructions that are stored in memory 1716. The mobile device 102 may further comprise non-volatile storage 1718. The instructions stored in memory 1716, when executed by the processor configure the mobile device 102 to provide secondary device messaging functionality 1720, messaging notification functionality 1722 as well as one or more messaging applications 1724. The secondary messaging functionality 1720 establishes a connection with the secondary computing device in order to send message indicators for messages received at the mobile device. The messaging notification functionality 1722 provides notifications for received message and may include functionality for determining an operating context and displaying notifications based on the context. The notification functionality may allow a user to control an amount of information displayed by the notification. The messaging applications 1724 receive messages from respective notification channels, such as e-mail, SMS and MMS messages, IN messages, push notification messages or other messaging applications.

The mobile device further comprises an input/output (I/O) component 1726 for connecting one or more components capable of providing input to the device or producing output. The mobile device 102 further comprises one or more sensors 1728 as well as one or more radios 1730 for establishing wireless communication with other computing devices.

The second computing device 206 comprises a display screen 1732, which may include a touch screen. The display 1732 of the second computing device is generally contemplated to be larger than the display of the mobile device 102. The second computing device 206 comprises a processor 1734 for executing instructions that are stored in a memory 1736. The second computing device 206 may further comprise non-volatile storage 1748. The instructions stored in memory 1736, when executed by the processor configure the second computing device 102 to provide mobile device messaging functionality 1740 as well as message notification generation functionality 1742. The mobile device messaging functionality 1740 establishes a connection with the secondary device messaging functionality 1720 of the mobile device in order to receive message indicators for messages received at the mobile device. The message notification generation functionality 1742 may comprises various functionality for generating notifications as described here. The functionality may comprise positioning based action notification functionality 1744. The position based action notification functionality 1744 allows a notification representation of a message that has a direct action area for carrying out a direct action associated with the message, to be progressively displayed based on positioning information of an input component. The message notification generation functionality 1742 may further comprise context based notification functionality for generating a notification representation for a message based on a current operating context of the computing device.

The second computing device further comprises an input/output (I/O) component 1748 for connecting one or more components capable of providing input to the computing device or producing output. The second computing device 206 further comprises one or more sensors 1750 as well as one or more radios 1752 for establishing wireless communication with other computing devices.

Figure 18:
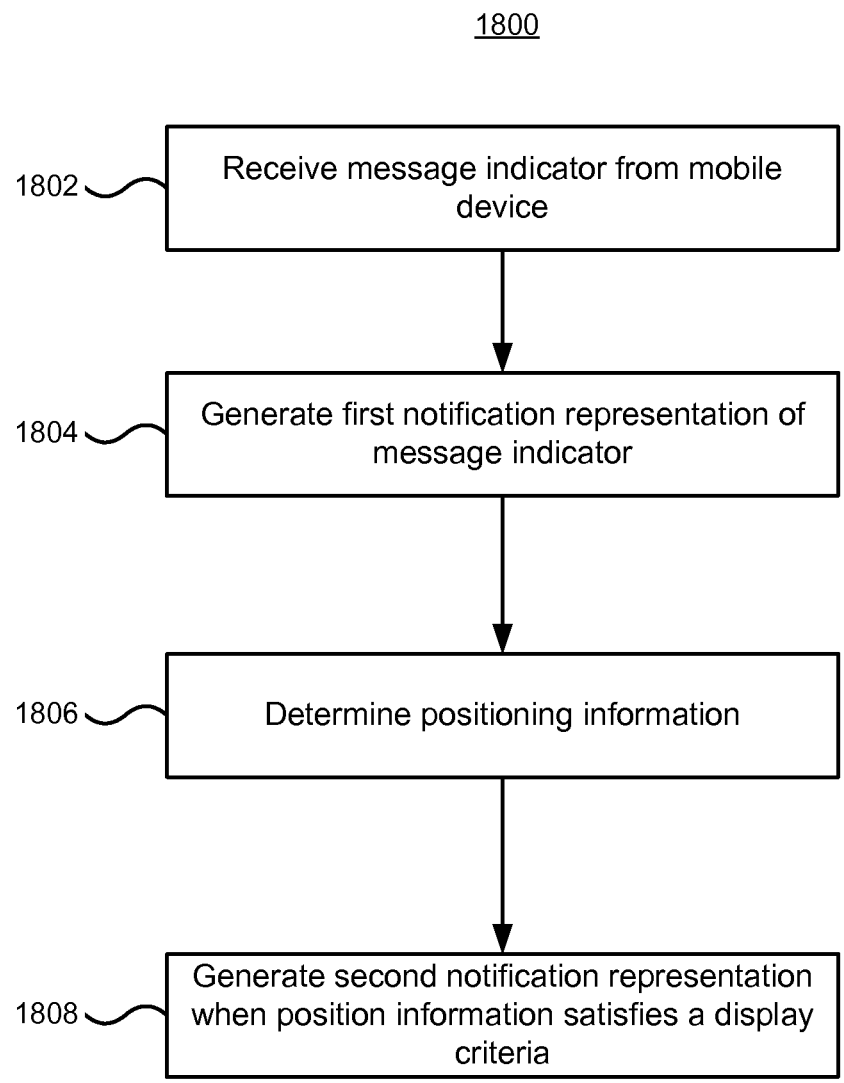
FIG. 18 depicts a method for generating message notifications at a computing device.

FIG. 18 depicts a method for generating message notifications at a computing device. The method 1800 receives at the computing device a received message indicator from a mobile device (1802). The received message indicator is associated with a message received by the mobile device. The received message indicator may be sent from the portable computing device to the computing device over a communication channel established between the two devices. The communication channel may be established over a wired or wireless channel, such as Ethernet, Universal Serial Bus (USB), Wi-Fi, Bluetooth, ZigBee or other communication technologies. Once the received message indicator is received at the computing device a first notification representation of the received message indicator is generated at the computing device (1804), and positioning information from an input component is determined (1806). Input component may be a mouse or pointing device connected to the computing device, a touch screen input as well as sensors of the mobile device. A second notification representation is generated comprising at least a portion of the message received at the mobile device and an action area for performing a direct action in response to the received message when the determined positioning information satisfies a display criteria associated with the second notification representation (1808).

Figure 19:
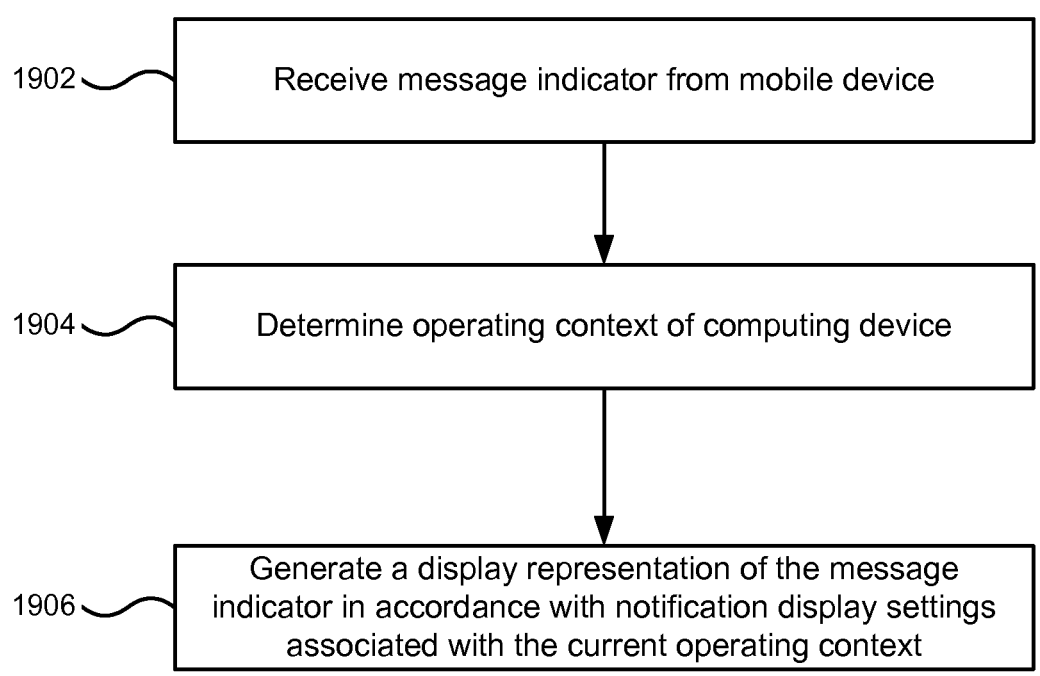
FIG. 19 depicts a further method for generating message notifications at a computing device.

FIG. 19 depicts a further method for generating message notifications at a computing device. The method 1900 receives at the computing device a message indicator from a mobile device (1902). The message indicator is associated with a message received by the mobile device. The method determines a current operating context of the computing device (1904) and generates at the computing device a notification representation of the message indicator in accordance with notification display settings associated with the determined current operating context (1906). The notification display settings associated with the determined operating context can provide rules for determining how a received message notification should be displayed including whether it should be a blank display that does not provide a visual notification to the user.

Figure 20:
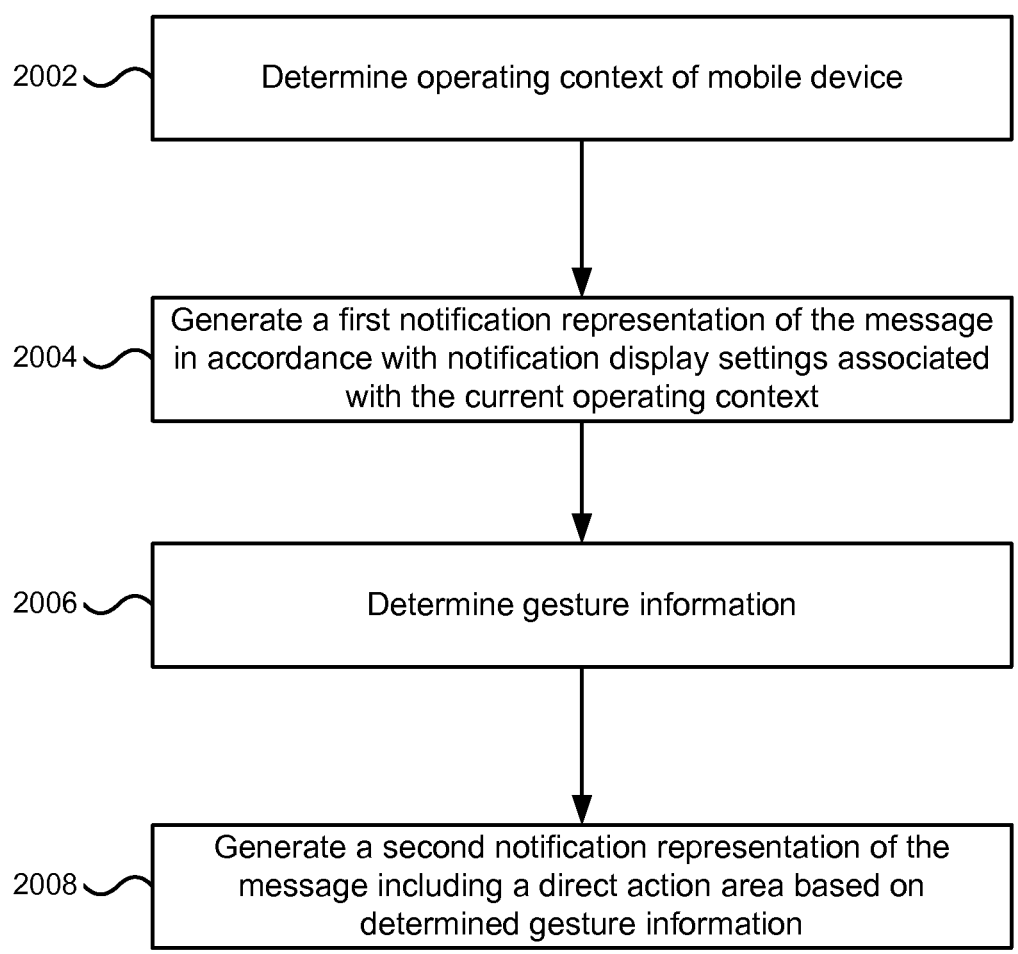
FIG. 20 depicts a further method for generating message notifications on a mobile device.

FIG. 20 depicts a further method for generating message notifications on a mobile device based upon an operating context. The method 2000 may receive a message indicator at the mobile device, which may be for a message received at the mobile device or generated at the mobile device. When the message indicator is received, the method determines an operating context of the mobile device (2002). The operating context may indicate a current operating state of the mobile device such as which applications are running, which applications are displayed among other settings or characteristics of the mobile device. A first notification representation of the message is generated in accordance with notification display settings associated with the current operating context (2004), and gesture information is determined (2006). When the determined gesture information satisfies a display criteria, a second notification representation of the message including a direct action area is generated (2008).

The above has described various methods for displaying notification representations on computing devices. Although displaying a single display representation is described above, it is possible to display multiple notifications at the same time. If multiple display representations are to be displayed at the same time, they may be displayed one above the other. Additionally or alternatively, if a number of notification representations are to be displayed, a number, for example two, may be displayed and the display changed to display the additional notification representations after a short period of time. Further, if a notification representation is to be displayed that requires user interaction in order to dismiss, it may be continually displayed and additional notification representations displayed below it.

Although certain methods, apparatus, computer readable memory, and articles of manufacture have been described herein, the scope of coverage of this disclosure is not limited thereto. To the contrary, this disclosure covers all methods, apparatus, computer readable memory, and articles of manufacture fairly falling within the scope of the appended claims either literally or under the doctrine of equivalents.

Although the following discloses example methods, system and apparatus including, among other components, software executed on hardware, it should be noted that such methods, system and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods, system and apparatus.

What is claimed is:

1. A method for generating message notifications at a mobile device, the method comprising:
    determining, by a notification functionality at the mobile device a current operating context of the mobile device;
    receiving a message at the mobile device, wherein the message is associated with an application of the mobile device;
    generating, by the notification functionality, on a display of the mobile device, a first notification representation for the message in accordance with one or more notification display settings associated with the determined current operating context;
    determining gesture information from a touch input component while the first notification representation is displayed;
    generating, in response to the determined gesture information, on the display of the mobile device, a second notification representation comprising at least a portion of the message and an action area for performing a direct action associated with the message;
    suppressing, by the notification functionality, the first notification representation as a result of determining that the current operating context comprises displaying the application in the foreground; and
    presenting, by the notification functionality, the first notification representation as a result of determining that the current operating context does not comprise displaying in the application messages associated with the application;
    wherein the notification functionality comprises software which provides notifications for multiple applications on the mobile device;
    wherein the one or more notification display settings associated with the current operating context specify one or more characteristics of the message and the associated operating context characteristic for use in generating at least one of the first notification representation or the second notification representation, the one or more characteristics of the message comprising one or more of a sender of the message, a receiver of the message, a subject of the message, or a body of the message.

2. The method of claim 1 wherein generating the second notification representation is performed when the determined gesture information satisfies a display criterion associated with the second notification representation.

3. The method of claim 1, wherein determining a current operating context comprises determining one or more of:
    running applications;
    applications displayed on the mobile device; or
    a communication channel associated with the message and a communication channel associated with an application displayed on the mobile device.

4. The method of claim 1, wherein the operating context characteristic for use in generating the at least one of the first notification representation or the second notification representation comprises one or more of:
    visibility of the at least one of the first notification representation or the second notification representation;
    characteristics of the message to include in the at least one of the first notification representation or the second notification representation; or
    location of the at least one of the first notification representation or the second notification representation.

5. The method of claim 1, wherein the direct action comprises one or more of:
replying to the message;
sharing the message with one or more contacts;
marking the message as read; or
deleting the message.

6. The method of claim 1, further comprising sending text received in the action area to an originator of the message.

7. The method of claim 1, further comprising forwarding the message to one or more contacts in response to an action performed in the action area.

8. The method of claim 1, wherein the message provides an indication of a missed call, and wherein the action area presents a direct action for returning the missed call.

9. A mobile device comprising:
a processor for executing instructions; and
a memory coupled to the processor storing instructions, which when executed by the processor configure the mobile device to:
determine, by a notification functionality at the mobile device a current operating context of the mobile device;
receive a message at the mobile device, wherein the message is associated with an application of the mobile device;
generate by the notification functionality on a display of the mobile device, a first notification representation for the message in accordance with one or more notification display settings associated with the determined current operating context;
determine gesture information from a touch input component while the first notification representation is displayed;
generate, in response to the determined gesture information, on the display of the mobile device, a second notification representation comprising at least a portion of the message and an action area for performing a direct action associated with the message;
suppress, by the notification functionality, the first notification representation when the current operating context comprises displaying the application in the foreground; and
present, by the notification functionality, the first notification representation when the current operating context does not comprise displaying in the application messages associated with the application;
wherein the notification functionality comprises software which provides-notifications for multiple applications on the mobile devices;
wherein the one or more notification display settings associated with the current operating context specify one or more characteristics of the message and the associated operating context characteristic for use in generating at least one of the first notification representation or the second notification representation, the one or more characteristics of the message comprising one or more of a sender of the message, a receiver of the message, a subject of the message, or a body of the message.

10. The mobile device of claim 9, wherein generating the second notification representation is performed when the determined gesture information satisfies a display criterion associated with the second notification representation.

11. The mobile device of claim 9, wherein determining a current operating context comprises determining one or more of:
running applications;
applications displayed on the mobile device; or
a communication channel associated with the message and a communication channel associated with an application displayed on the mobile device.

12. The mobile device of claim 9, wherein the operating context characteristic for use in generating the at least one of the first notification representation or the second notification representation comprises one or more of:
visibility of the at least one of the first notification representation or the second notification representation;
characteristics of the message to include in the at least one of the first notification representation or the second notification representation; or
location of the at least one of the first notification representation or the second notification representation.

13. The mobile device of claim 9, wherein the direct action comprises one or more of:
replying to the message;
sharing the message with one or more contacts;
marking the message as read; or
deleting the message.

14. The mobile device of claim 9, wherein the message provides an indication of a missed call, and wherein the action area presents a direct action for returning the missed call.

15. A non-transitory computer readable medium having stored thereon executable code for execution by a processor of a mobile device, the executable code comprising instructions for:
determining, by a notification functionality at the mobile device a current operating context of the mobile device;
receiving a message at the mobile device, wherein the message is associated with an application of the mobile device;
generating by the notification functionality on a display of the mobile device, a first notification representation for the message in accordance with one or more notification display settings associated with the determined current operating context;
determining gesture information from a touch input component while the first notification representation is displayed;
generating, in response to the determined gesture information, on the display of the mobile device, a second notification representation comprising at least a portion of the message and an action area for performing a direct action associated with the message;
suppressing, by the notification functionality, the first notification representation when the current operating context comprises displaying the application in the foreground; and
presenting, by the notification functionality, the first notification representation when the current operating context does not comprise displaying in the application messages associated with the application;
wherein the notification functionality comprises software which provides-notifications for multiple applications on the mobile devices;
wherein the one or more notification display settings associated with the current operating context specify one or more characteristics of the message and the associated operating context characteristic for use in generating at least one of the first notification representation or the second notification representation, the one or more characteristics of the message comprising one or more of a sender of the message, a receiver of the message, a subject of the message, or a body of the message.

16. The non-transitory computer readable medium of claim 15, wherein generating the second notification representation is performed when the determined gesture information satisfies a display criterion associated with the second notification representation.

17. The non-transitory computer readable medium of claim 15, wherein determining a current operating context comprises determining one or more of:
   running applications;
   applications displayed on the mobile device; or
   a communication channel associated with the message and a communication channel associated with an application displayed on the mobile device.

18. The non-transitory computer readable medium of claim 15, wherein the operating context characteristic for use in generating the at least one of the first notification representation or the second notification representation comprises one or more of:
   visibility of the at least one of the first notification representation or the second notification representation;
   characteristics of the message to include in the at least one of the first notification representation or the second notification representation; or
   location of the at least one of the first notification representation or the second notification representation.

19. The non-transitory computer readable medium of claim 15, wherein the direct action comprises one or more of:
   replying to the message;
   sharing the message with one or more contacts;
   marking the message as read; or
   deleting the message.

20. The non-transitory computer readable medium of claim 15, wherein the message provides an indication of a missed call, and wherein the action area presents a direct action for returning the missed call.

* * * * *

UNITED STATES PATENT AND TRADEMARK OFFICE
CERTIFICATE OF CORRECTION

PATENT NO. : 10,728,716 B2  
APPLICATION NO. : 13/931166  
DATED : July 28, 2020  
INVENTOR(S) : Ryan David Steeves et al.

Page 1 of 1

It is certified that error appears in the above-identified patent and that said Letters Patent is hereby corrected as shown below:

In the Claims

Column 15, Line 51 (approx.), Claim 9, delete "provides-notifications" and insert -- provides notifications --;

Column 15, Line 52 (approx.), Claim 9, delete "devices;" and insert -- device; --;

Column 16, Line 61, Claim 15, delete "provides-notifications" and insert -- provides notifications --;

Column 16, Line 62, Claim 15, delete "devices;" and insert -- device; --.

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*